United States Patent
Fujii

(10) Patent No.: US 8,777,334 B2
(45) Date of Patent: Jul. 15, 2014

(54) CONTROL APPARATUS FOR VEHICLE

(75) Inventor: Yusuke Fujii, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 140 days.

(21) Appl. No.: 13/445,417

(22) Filed: Apr. 12, 2012

(65) Prior Publication Data

US 2013/0020857 A1    Jan. 24, 2013

(30) Foreign Application Priority Data

Jul. 19, 2011    (JP) .................................. 2011-157728

(51) Int. Cl.
*B60T 8/60*    (2006.01)

(52) U.S. Cl.
USPC ........................... 303/151; 303/113.4; 303/20

(58) Field of Classification Search
USPC ................. 303/3, 20, 113.1, 113.4, 151, 152; 701/22
See application file for complete search history.

(56) References Cited

U.S. PATENT DOCUMENTS

| | | | |
|---|---|---|---|
| 8,509,978 B2 * | 8/2013 | Kato et al. | 701/22 |
| 2005/0269875 A1 * | 12/2005 | Maki et al. | 303/152 |
| 2006/0220453 A1 * | 10/2006 | Saito et al. | 303/152 |

FOREIGN PATENT DOCUMENTS

| | | |
|---|---|---|
| JP | 11-115703 A | 4/1999 |
| JP | 2007-276534 A | 10/2007 |
| WO | WO 2010050046 A1 * | 5/2010 |

* cited by examiner

*Primary Examiner* — Thomas J Williams
(74) *Attorney, Agent, or Firm* — Crowell & Moring LLP

(57) ABSTRACT

In a control apparatus for a vehicle, a brake control unit includes: a master cylinder state variable detecting section configured to detect a master cylinder state variable related to a state of a master cylinder; a first regenerative braking force calculating section configured to calculate a first regenerative braking force when the master cylinder state variable detected by the master cylinder state variable detecting section is smaller than a predetermined state variable; a second regenerative braking force calculating section configured to calculate a second regenerative braking force when the master cylinder state variable detected by the master cylinder state variable detecting section is equal to or larger than a predetermined state variable; and a braking control section configured to calculate the liquid pressure braking force on a basis of at least one of the calculated first and second regenerative braking forces.

12 Claims, 11 Drawing Sheets

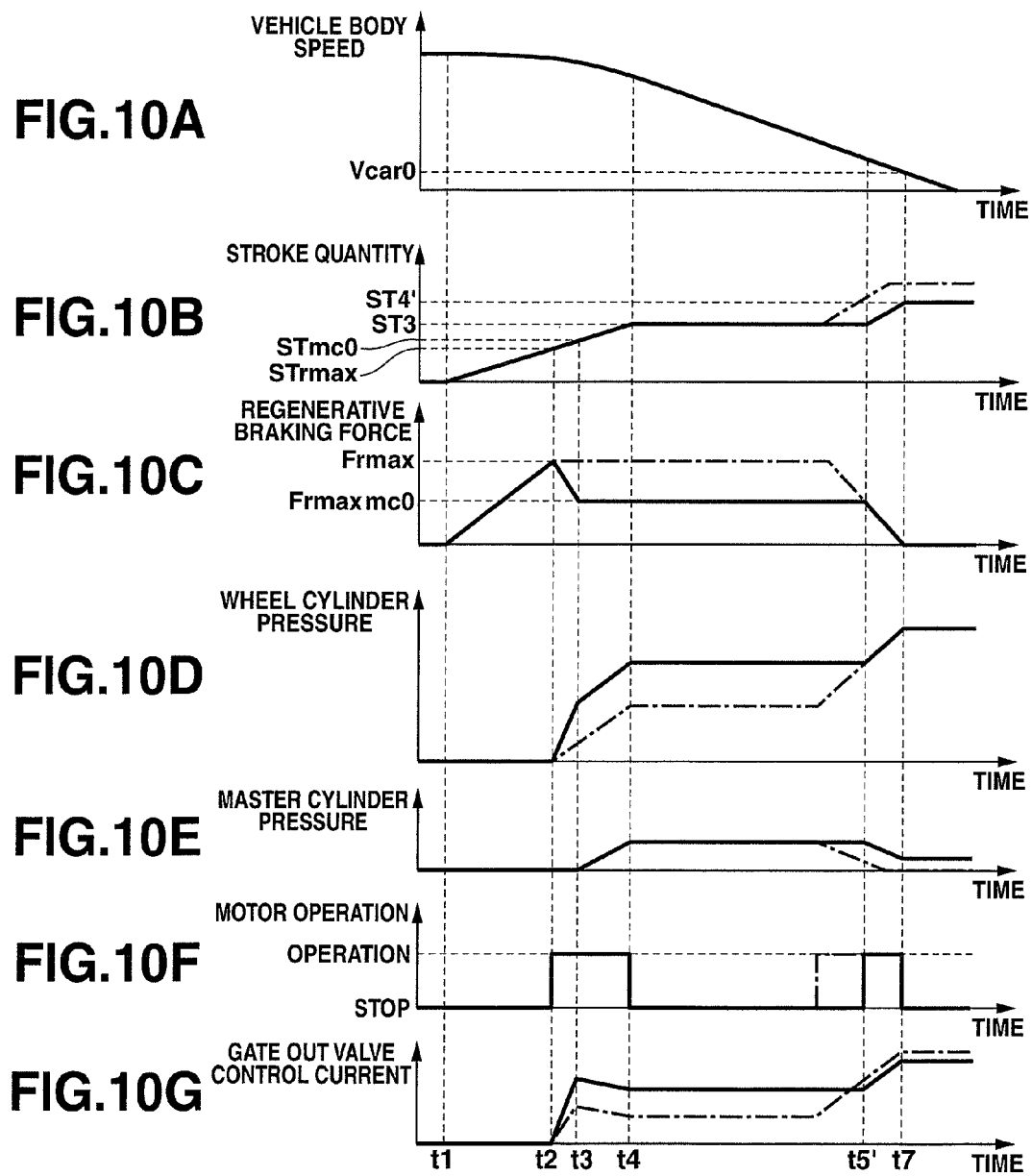

CONTROL APPARATUS FOR VEHICLE

BACKGROUND OF THE INVENTION (1) Field of the Invention

The present invention relates to a control apparatus for a vehicle and particularly relates to a brake control apparatus for the vehicle.

(2) Description of Related Art

A previously proposed control apparatus for a vehicle is to exemplified by a Japanese Patent Application First Publication (tokkai) No. 2007-276534 published on Oct. 25, 2007. In the above-described previously proposed control apparatus for the vehicle, an increasing speed of a liquid pressure braking force is limited to suppress a decreasing speed of a pedal reaction force, to reduce such an abrupt brake pedal suction feeling that a vehicle driver unpleasantly feels, the brake pedal suction feeling being developed when a braking force is switched from a regenerative braking force to the liquid pressure braking force along with a reduction in the regenerative driving force. It should be noted that a definition of the brake pedal suction feeling will be described later.

SUMMARY OF THE INVENTION

However, there are recent demands that the brake pedal suction feeling is needed to be desirably further reduced.

It is, therefore, an object of the present invention to provide a control apparatus for a vehicle which is capable of further reducing the brake pedal suction feeling given to the vehicle driver.

According to one aspect of the present invention, there is provided with a control apparatus for a vehicle, comprising: a regenerative brake unit configured to obtain a calculated regenerative braking force for road wheels; a master cylinder actuated in accordance with a brake manipulated variable of a vehicle driver; a liquid pressure brake unit having a pump to supply a brake liquid sucked from the master cylinder to wheel cylinders installed on the respective road wheels under pressure to obtain a calculated liquid pressure braking force, the regenerative brake unit, the master cylinder, and the liquid pressure brake unit being provided to obtain a driver's demanded braking force calculated on a basis of a brake manipulation by the vehicle driver; and a control unit including: a master cylinder state variable detecting section configured to detect a master cylinder state variable related to a state of the master cylinder; a first regenerative braking force calculating section configured to calculate a first regenerative braking force when the master cylinder state variable detected by the master cylinder state variable detecting section is smaller than a predetermined state variable; a second regenerative braking force calculating section configured to calculate a second regenerative braking force which is smaller than the first regenerative braking force when the master cylinder state variable detected by the master cylinder state variable detecting section is equal to or larger than the predetermined state variable; and a braking control section configured to calculate the liquid pressure braking force on a basis of at least one of the calculated first and second regenerative braking forces.

According to another aspect of the present invention, there is provided with a control apparatus for a vehicle, comprising: a regenerative brake unit configured to obtain a regenerative braking force based on a calculated regenerative braking force command value for road wheels; a master cylinder actuated in accordance with a brake manipulated variable of a vehicle driver; a liquid pressure brake unit having a pump to supply a brake liquid sucked from the master cylinder to wheel cylinders installed on the respective road wheels under pressure to obtain a liquid pressure braking force based on a calculated liquid pressure braking force command value, the regenerative brake unit, the master cylinder, and the liquid pressure brake unit being provided to obtain a driver's demanded braking force calculated on a basis of a brake manipulation by the vehicle driver; and a control unit including: a brake manipulated state variable detecting section configured to detect a brake manipulated state variable related to a brake manipulation state of the driver; a first regenerative braking force command value calculating section configured to calculate a first regenerative braking force command value when the brake manipulation state variable detected by the brake manipulation state variable detecting section is smaller than a predetermined state variable; a second regenerative braking force command value calculating section configured to calculate a second regenerative braking force command value which is smaller than the first regenerative braking force command value when the brake manipulation state variable detected by the brake manipulation state variable is equal to or larger than the predetermined state variable; and a braking control section configured to increase the liquid pressure braking force command value when the brake manipulation state variable detected by the brake manipulation state variable detecting section is equal to or larger than the predetermined state variable.

According to a still another aspect of the present invention, there is provided with a control apparatus for a vehicle, comprising: a regenerative brake unit configured to obtain a regenerative braking force based on a calculated regenerative braking force command value for road wheels; a liquid pressure brake unit to obtain a liquid pressure braking force, the liquid pressure brake unit being configured to supply a brake liquid sucked from a master cylinder actuated in accordance with a brake manipulated variable of a vehicle driver to wheel cylinders installed on the respective road wheels to obtain the liquid pressure braking force based on the calculated liquid pressure braking force, the regenerative brake unit, the master cylinder, and the liquid pressure brake unit being provided to obtain a driver's demanded braking force calculated on a basis of a brake manipulation by the vehicle driver; a brake manipulation stroke quantity sensor configured to detect a brake manipulated stroke quantity of the vehicle driver; a first regenerative braking force command value calculating section configured to calculate a first regenerative braking force command value when the stroke quantity detected by the brake manipulation stroke quantity sensor is smaller than a predetermined stroke quantity; a second regenerative braking force command value calculating section configured to calculate a second regenerative braking force command value which is smaller than the first regenerative braking force command value when the stroke quantity detected by the brake manipulation stroke quantity sensor is equal to or larger than the predetermined stroke quantity; and a braking control section configured to increase the liquid pressure braking force command value and decrease the second regenerative braking force command value to generate the driver's demanded braking force when the stroke quantity detected by the brake manipulation stroke quantity sensor is equal to or larger than the predetermined stroke quantity.

BRIEF DESCRIPTION OF THE DRAWINGS

FIGS. 10A through 10G are integrally a timing chart representing a brake pedal depression increase and hold operation in a case where the limitation of regenerative braking force according to regenerative allowance quantity Frstmax is carried out.

DETAILED DESCRIPTION OF THE INVENTION

Hereinafter, preferred embodiments of a control apparatus for a vehicle according to the present invention will be described with reference to the accompanied drawings in order to facilitate a better understanding of the present invention. The preferred embodiments described below have been discussed to meet many needs. A further reduction in a brake pedal suction feeling developed when a braking force is switched from the regenerative braking force to the liquid pressure braking force along with the reduction in the regenerative driving force can be achieved. This is one of the needs to be discussed. It should be noted that the brake pedal suction feeling is an unpleasant feeling that a vehicle driver gives and can be defined as follows. That is to say, a pedal reaction force of a brake pedal is created by a pressure of a master cylinder. In a case where the driver depresses the brake pedal with a constant depression force, the driver causes the brake pedal to be stroked by a quantity corresponding to the reduction in the pedal reaction force if the pedal reaction force is decreased so that the driver gives the brake pedal suction feeling.

First Embodiment

First, a structure of the control apparatus for the vehicle in a first preferred embodiment according to the present invention will be described below.

Figure 1:
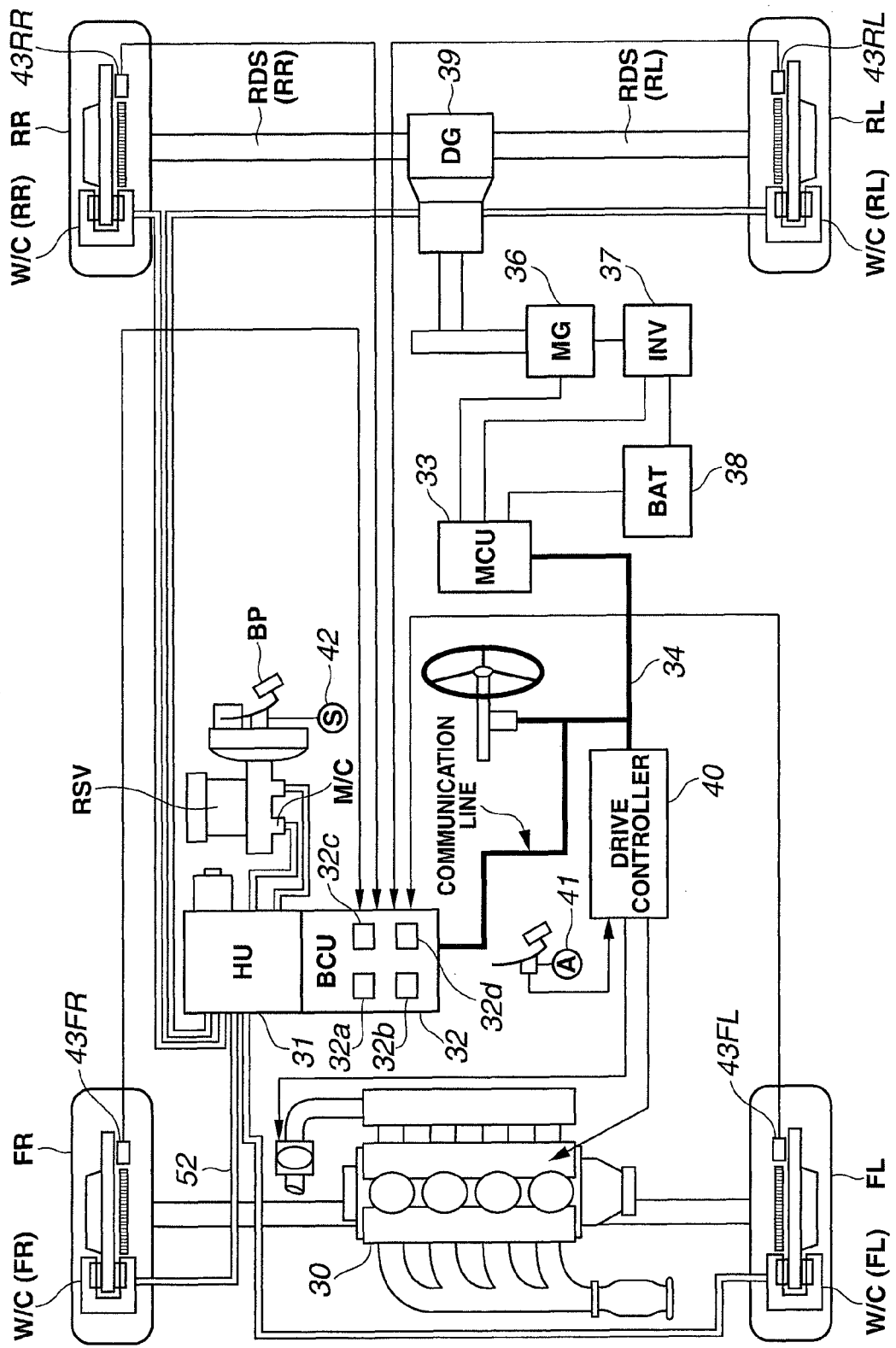
FIG. 1 is a system configuration view representing a brake/drive system of a vehicle to which a control apparatus for a vehicle in a first preferred embodiment according to the present invention is applicable.

FIG. 1 shows a system configuration representing a brake/drive system of a vehicle to which the control apparatus for the vehicle in the first embodiment is applicable.

(System Configuration)

A drive controller 40 receives: an accelerator opening angle from an accelerator opening angle sensor 41; a vehicle speed (a vehicle body speed) calculated through wheel speed sensors 43FL, 43FR, 43RL, 43RR installed on respective road wheels FL, FR, RL, RR; a battery SOC (State Of Charge); and so forth. Drive controller 40 performs an operation control of an engine 30 to drive left and right front road wheels FL, FR, an operation control for an automatic transmission (not shown), and an operation control for a motor-generator (hereinafter, MG) 36 in response to a drive command to a motor control unit (hereinafter, MCU) 33.

A regenerative brake unit, in the first embodiment, includes: MCU 33; MG 36; an inverter (INV) 37, and a battery (BAT) 38 and generates a regenerative braking force for left and right rear road wheels RL, RR. MCU 33 issues a command to perform a power run (acceleration) through MG 36 on a basis of a drive command from drive controller 40. In addition, a regenerative command is received by MCU 33 via a communication line 34 from a brake control unit 32 (a controller or a control unit, hereinafter, BCU), a regenerative driving of MG 36 is performed in response to the regenerative command, and a regenerative braking force state developed at least by MG 36 is transmitted to BCU 32 via communication line 34. MG 36 is linked to left and right rear road wheels RL, RR via drive shafts RDS (RL), RDS (RR) and a differential gear 39, respectively. On a basis of the command issued from a command from MCU 33, MG 36 performs a power running (acceleration) or regenerative driving to provide a driving force or braking force for left and right rear road wheels RL, RR.

INV 37 inverts a direct current electric power of BAT 38 into an alternating current electric power to be supplied to MG 36. On the other hand, in a case where MG 36 performs the regenerative running, the alternating current electric power generated in MG 36 converts the alternating current electric power generated in MG 36 to the direct current electric power to charge BAT 38.

BCU 32 calculates a braking force required for the vehicle (driver's demanded braking torque) and the regenerative braking force requested for MCU 33 on a basis of an information from a stroke sensor 42 (also called, a master cylinder state variable detecting section, a brake manipulated variable detecting section, or a brake operation stroke quantity sensor) attached onto a brake pedal BP to detect a stroke quantity of a bake pedal BP, issues a regeneration command to MCU 33, calculates a liquid pressure braking force to be generated on each of the road wheels on a basis of a state of the regenerative braking force received from MCU 33, and issues an operation command to a hydraulic pressure control unit (hereinafter, HU) 31.

HU 31 performs a hold, a pressure increase, or a pressure decrease of the respective liquid pressures of a wheel cylinder W/C (FL) for left front road wheel FL, a wheel cylinder W/C (FR) for right front road wheel FR, a wheel cylinder W/C (RR) for right rear road wheel RR, and a wheel cylinder W/C (RL) for left rear road wheel RL on a basis of the operation command from BCU 32.

Figure 2:
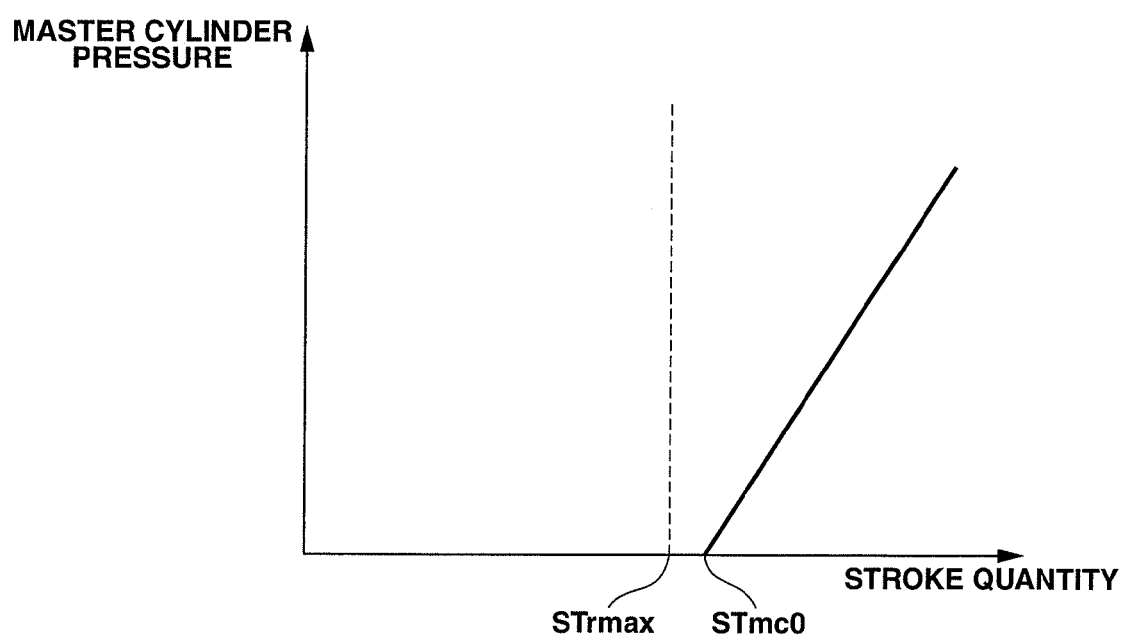
FIG. 2 is a characteristic graph representing a master cylinder pressure of a master cylinder M/C versus a stroke quantity of master cylinder M/C in the first embodiment.

A master cylinder M/C supplies a brake liquid supplied from a reservoir tank RSV to HU 31 in accordance with the stroke quantity of brake pedal BP. Master cylinder M/C in the first embodiment provides a stroke corresponding master cylinder having a master cylinder pressure-versus-stroke quantity characteristic as shown in FIG. 2. Master cylinder M/C in the first embodiment has a characteristic such as not to generate the master cylinder pressure until the stroke quantity of brake pedal BP has reached to a predetermined stroke quantity STmc0 exceeding STrmax and, in the stroke quantity equal to or larger than STmc0, the master cylinder pressure is increased in accordance with the increase in the stroke quantity. This characteristic can be realized by setting an invalid stroke quantity of brake pedal BP (a stroke quantity from an initial position to a liquid pressure generation start) to STmc0. It should be noted that STrmax is a stroke quantity when the braking force required for the vehicle which is determined from the stroke quantity of brake pedal BP indicates a maximum regenerative braking force which is an upper limit value of the regenerative braking force determined from characteristics and capacities of MG 36 and INV 37. In the characteristic shown in FIG. 2, STmc0 may be made coincident with STrmax. The liquid pressure brake unit in the first embodiment is constituted by BCU 32 and HU 31 and generates the liquid pressure braking force for each of road wheels FL, FR, RL, RR.

[Brake Circuit Structure]

Figure 3:
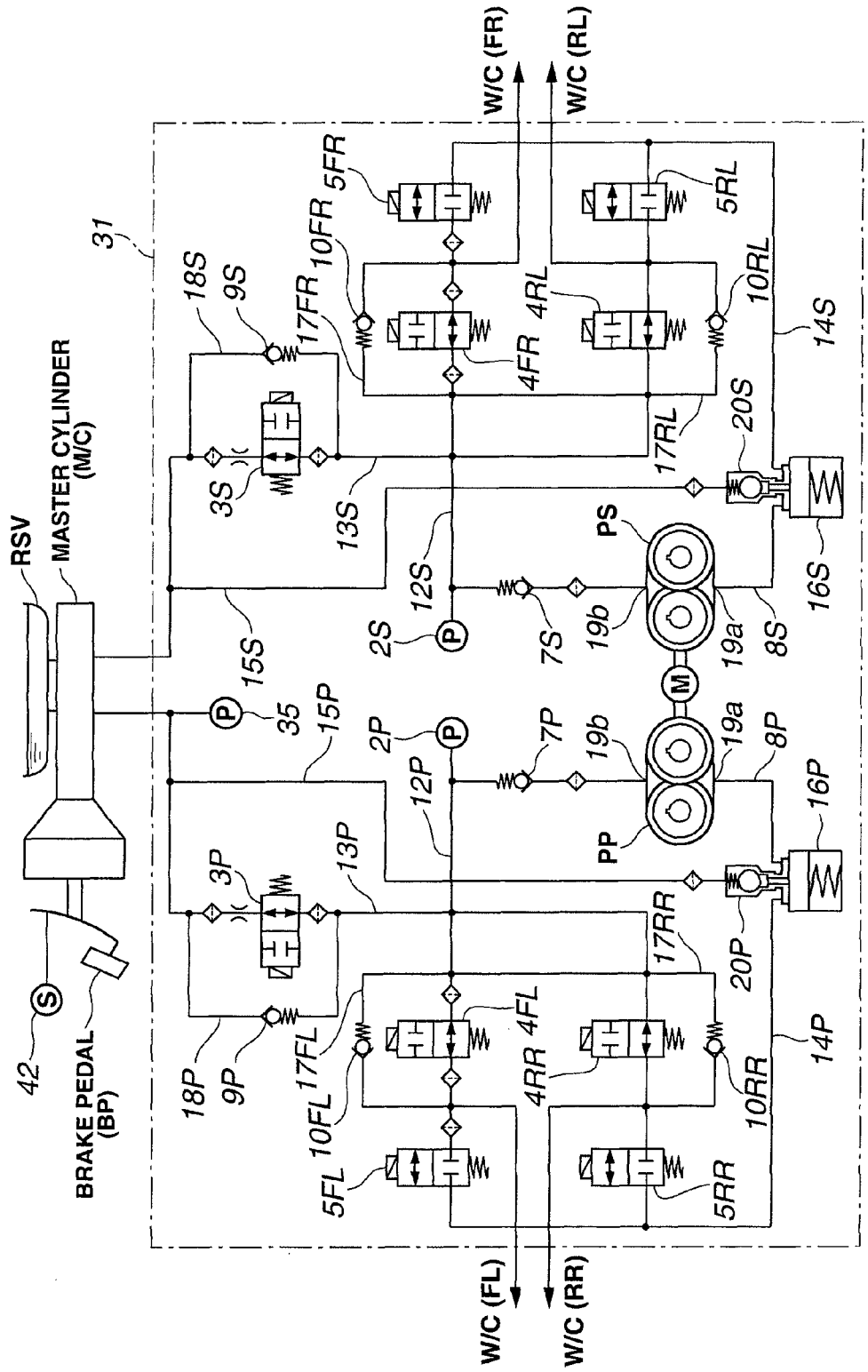
FIG. 3 is a configuration view of a hydraulic pressure control unit (HU 31) in the first embodiment shown in FIG. 1.

FIG. 3 is a configuration view of hydraulic pressure control unit (HU) 31 in the first embodiment.

HU 31 has a piping structure called X piping and is constituted by two systems of a P (primary) system and a S (secondary) system using a closed hydraulic pressure circuit. It should, herein, be noted that the closed hydraulic pressure circuit is defined as the hydraulic circuit in which the brake liquid supplied to each wheel cylinder W/C is returned to reservoir tank RSV via master cylinder M/C. On the other hand, the hydraulic circuit in which the brake liquid supplied to each wheel cylinder W/C can directly be returned to reservoir tank RSV not via master cylinder M/C is called an open hydraulic pressure circuit.

P and S attached to an end of each reference numeral shown in FIG. 3 denote the P system and the S system, respectively, and FL, FR, RR, RL attached to each end of reference numerals shown in FIG. 3 correspond to the left front road wheel, the right front road wheel, the right rear road wheel, and the left rear road wheel, respectively. When P, S systems are not classified and each road wheel is not classified, P, S or FL, FR, RR, RL are not omitted. In the P system, wheel cylinders W/C (FL) for left front road wheel FL and W/C (RR) for right rear road wheel RL are connected. In the S system, wheel cylinders W/C (FL) for left front road wheel FR and W/C (RR) for right rear road wheel (RR) are connected. In addition, a pump PP and a pump PS are installed for respective systems of P and S. Both pumps PP, PS are actuated by means of a single motor M. Brake liquid sucked from a suction section 19a is discharged by means of each of both pumps PP, PS to a discharge section 19b. A plunger pump or gear pump is appropriately mounted as pump P.

Master cylinder M/C and a low-pressure hydraulic pressure reservoir 16 (hereinafter, referred to as a hydraulic pressure reservoir) are interconnected with a pipeline 15. Reservoir 16 is provided with a pressure responsive type check valve mechanism 20 (20P, 20S) which allows a flow of the brake liquid directed from pipeline 15 (15P, 15S) toward an inner side of the reservoir when pipeline 15 indicates a pressure equal to or lower than a predetermined pressure and which inhibits the flow of the brake liquid directed from pipeline 15 (15P, 15S) toward the inner part of the hydraulic pressure reservoir when pipeline 15 (15P, 15S) indicates a high pressure exceeding the predetermined pressure. A suction side of each pump PP, PS and hydraulic pressure reservoir 16 (16P, 16S) are interconnected with each other via a pipeline 8 (8P, 8S).

A pipeline 12 (12P, 12S) serves to interconnect the discharge side of pump P and each wheel cylinder W/C. A solenoid in valve 4 (4FR, 4FL, 4RR, 4RL) as a normally open type is disposed on pipeline 12 which corresponds to each wheel cylinder W/C. In addition, a check valve 7 (7P, 7S) is disposed between each solenoid in valve 4 and pump P. Check valve 7 allows the flow of the brake liquid from pump P to solenoid in valve 4 and inhibits the flow in the reverse direction from solenoid in valve 4 to pump P (PP, PS). Furthermore, a pipeline 17 (17P, 17S) is disposed on pipeline 12 which bypasses each solenoid in valve 4 and a check valve 10 is installed on pipeline 17. Each check valve 10 (10FL, 10FR, 10RL, 10RR) allows the flow of brake liquid from wheel cylinder W/C (FL, FR, RL, RR) to pump P (PP, PS) and inhibits the reverse flow.

A pipeline 13 (13P, 13S) is used to interconnect master cylinder M/C and pipeline 12 (12P, 12S) and pipeline 12 and pipeline 13 are joined between pump P (PP, PS) and solenoid in valve 4. A gate out valve 3 (3P, 3S) of a normal open type electromagnetic valve is disposed on each pipeline 13 (13P, 13S). In addition, a pipeline 18 (18P, 18S) which bypasses each gate out valve 3 (3P, 3S) is disposed on each pipeline 13 (13P, 13S). A check valve 9 (9P, 9S) is installed on pipeline 18. Each check valve 9 allows the flow of the brake liquid from master cylinder M/C toward wheel cylinder W/C and inhibits the reverse flow thereof.

A pipeline 14 (14P, 14S) is used to interconnect between wheel cylinder W/C and hydraulic pressure reservoir 16 (16P, 16S). A solenoid out valve 5 (5FL, 5FR, 5RL, 5RR) of a normal closure type electromagnetic valve is disposed on each pipeline 14. Master cylinder pressure sensor 35 to detect the master cylinder pressure is disposed on pipeline 15P. It should be noted that, in place of pipeline 15P, master cylinder pressure sensor 35 may be disposed on pipeline 15S. A pump pressure sensor 2 (2P, 2S) is disposed on pipeline 12 (12P, 12S) to detect the discharge pressure of pump P (PP, PS).

[Regeneration Coordinative Control]

BCU 32 performs an energy collection by coordinating between the liquid pressure braking and the regenerative braking as a regeneration coordinative control. In a case where the regenerative braking force is limited due to the vehicle speed and an input/output limitation of BAT 38 during the regeneration coordinative control, the regenerative braking force is reduced and the liquid pressure braking force is accordingly increased to secure the braking force required for the vehicle. This is called a switch from the regenerative braking force to the liquid pressure braking force. Conversely, in a case where the limitation on the regenerative braking force is relieved, the regenerative braking force is increased and the liquid pressure braking force is accordingly reduced to improve the energy collection efficiency. This is called a switch from the liquid pressure braking force to the regenerative braking force.

Incidentally, when the switch is made from the liquid pressure braking force to the regenerative braking force, it is necessary to decrease the brake liquid of wheel cylinder W/C in order to decrease the pressure of the wheel cylinder W/C. On the other hand, in a case where the switch from the regenerative braking force to the liquid pressure braking force is made, it is necessary to increase the brake liquid of wheel cylinder W/C in order to increase the wheel cylinder pressure. Although a discharge destination of the brake liquid and a suction source of the brake liquid, master cylinder M/C and hydraulic pressure reservoir 16 (16P, 16S) can be listed. However, in the first embodiment, the discharge destination and the suction source are only the master cylinder M/C and the pressure in each wheel cylinder is the same.

Thus, in the first embodiment, in a case where the brake liquid of wheel cylinder W/C is discharged to master cylinder M/C, gate out valve 3 is opened and, in a case where the brake liquid of wheel cylinder W/C is sucked from master cylinder M/C, gate out valve 3 is closed and pump P (PP, PS) is actuated.

[Regeneration Coordinative Control Procedure]

In the first embodiment, when the switch from the regenerative braking force to the liquid pressure braking force is made, the regenerative braking force is limited in accordance with the stroke of brake pedal BP in order to reduce the brake pedal suction feeling due to the reduction in the master cylinder pressure. That is to say, by limiting previously the regenerative braking force, an increase quantity of the wheel cylinder pressure when the liquid pressure braking force is increased in accordance with the reduction in the regenerative braking force is suppressed and a quantity by which the pedal suction quantity is reduced to reduce the brake pedal suction feeling.

BCU 32, to realize the limitation of the regenerative braking force, includes: a first regenerative braking force calculating section (first regenerative braking force command value calculating section) 32a; a second regenerative braking force calculating section (a second regenerative braking force command value calculating section) 32b; a braking control section 32c; and a switch control section 32d.

First regenerative braking force calculating section 32a calculates a required regenerative braking force (first regenerative braking force) Frreq limited by a regenerative allowance quantity Frstmax in a case where the stroke quantity detected by stroke sensor 42 is smaller than STrmax.

Second regenerative braking force calculating section 32b calculates a required regenerative braking force (second regenerative braking force) Frreq limited by regenerative allowance quantity Frstmax in a case where the stroke quantity detected by stroke sensor 42 is equal to or larger than STrmax.

It should be noted that regenerative allowance quantity Frstmax provides a maximum regenerative braking force Frmax in a case where the stroke quantity is smaller than STrmax and provides a smaller value in a case where the stroke quantity is equal to or larger than Frmax. Thus, required regenerative braking force Frreq calculated by second regenerative braking force calculating section 32b is smaller than required regenerative braking force Frreq calculated by first regenerative braking force calculating section 32a. The calculation method of regenerative allowance quantity Frstmax will be described later. Braking control section 32c calculates a difference between required total braking force Freq and executing regenerative braking force Fr as a required liquid pressure braking force Fwcreq so that a sum between an executing regenerative braking force Fr which is a detection value of the regenerative braking force actually generated on a basis of required regenerative braking force Frreq and the liquid pressure braking force provides a required total braking force Freq which is the braking force required for the vehicle.

Switch control section 32d increases the liquid pressure braking force while required regenerative braking force Frreq is decreased to realize required total braking force Freq during a time interval during which the stroke quantity indicates a value from STrmax to STmc0.

Figure 4:
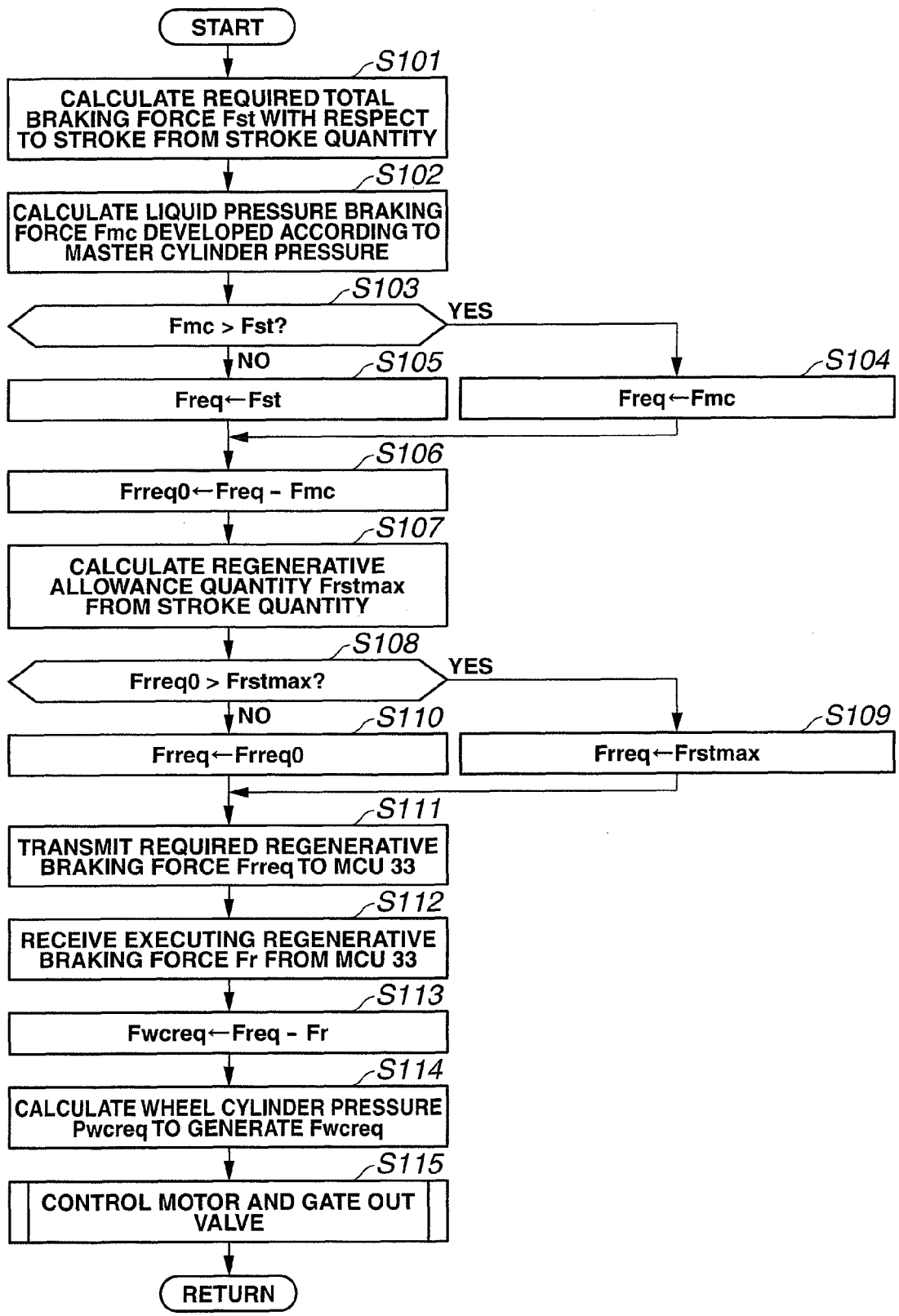
FIG. 4 is a flowchart representing a flow of a regenerative coordinative control procedure executing by a BCU 32 in the first embodiment shown in FIG. 1.

FIG. 4 shows a flowchart representing a flow of the regeneration coordinative control procedure in the first embodiment executed by BCU 32.

Figure 5:
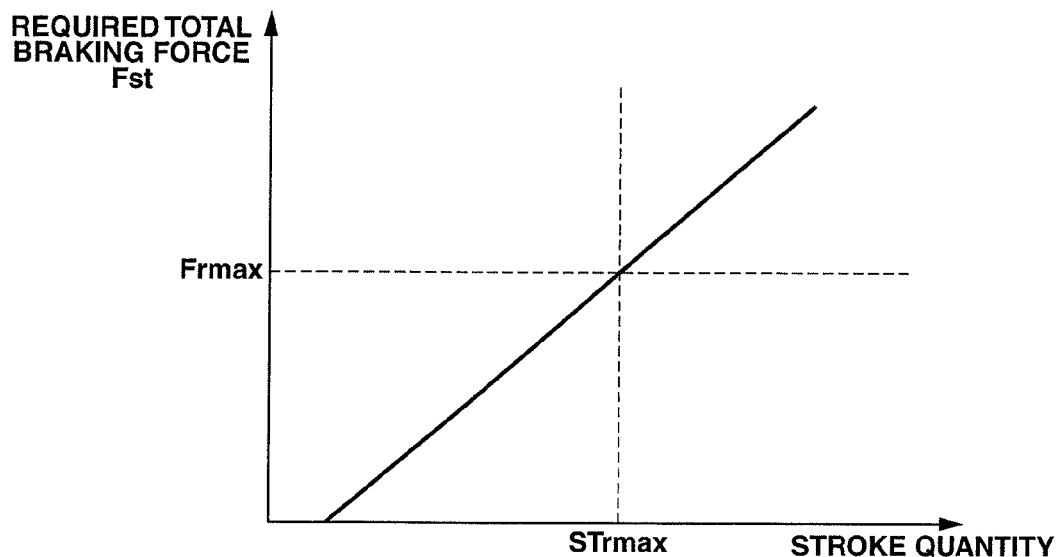
FIG. 5 is a setting map of a required total braking force Fst derived from a stroke quantity.

That is to say, at a step S101, BCU 32 calculates the braking force to be generated on the vehicle from the stroke quantity of brake pedal BP detected by stroke sensor 42 as a required total braking force Fst. Required total braking force Fst determined from the stroke quantity is set with reference to the map shown in FIG. 5. In FIG. 5, a longitudinal axis denotes required total braking force Fst derived from the stroke quantity of brake pedal BP. Required total braking force Fst is zero when the stroke quantity falls in a range of an ineffective stroke range and becomes increased in accordance with the increase in the stroke quantity in a case where the stroke quantity is in excess of the ineffective stroke. Then, when the stroke quantity is STrmax, required total braking force Fst becomes equal to maximum regenerative braking force Frmax. It should be noted that ineffective stroke quantity on the map shown in FIG. 5 is equivalent to the ineffective stroke quantity of the brake pedal and is smaller than an ineffective stroke quantity in master cylinder M/C in the first embodiment.

At a step S102, BCU 32 calculates liquid pressure braking force Fmc generated by the master cylinder pressure.

At a step S103, BCU 32 compares required total braking force Fst determined from the stroke quantity and liquid pressure braking force Fmc generated through the master cylinder pressure. A lower limit of the total braking force realized by the regeneration coordination is a sum of the lower limit of the regenerative braking force and the lower limit of the liquid pressure braking force. However, in the first embodiment, since gate out valve 3 (3P, 3S) and pump P (PP, PS) serve to control each wheel cylinder pressure, the lower limit of each wheel cylinder pressure provides the master cylinder pressure. In addition, since the lower limit of the regenerative braking force is zero, it is necessary for the required total braking force to be at least equal to or larger than liquid pressure braking force Fmc generated by the master cylinder pressure. Then, if Fmc is larger than Fst, the routine goes to a step S104. If not (No) at step S103, the routine goes to a step S105.

At step S104, BCU 32 applies liquid pressure braking force Fmc generated according to the master cylinder pressure to required total braking force Freq (Freq←Fmc).

At step S105, BCU 32 applies required total braking force Fst determined from the stroke quantity to required total braking force Freq (Freq←Fst).

At a step S106, BCU 32 calculates an allowable regenerative braking force Frreq0 which is a maximum regenerative braking force satisfying required total braking force Freq from required total braking force Freq and liquid pressure braking force Fmc developed according to the master cylinder pressure (Frreq←Freq−Fmc). Allowance regenerative braking force Frreq0 is given as the difference between required total braking force Freq and the minimum value of the liquid pressure braking force. The minimum value of the liquid pressure braking force is the liquid pressure braking force Fmc generated according to the master cylinder pressure and Frreq0 is calculated as a difference between Freq and Fmc (Freq−Fmc).

Figure 6:
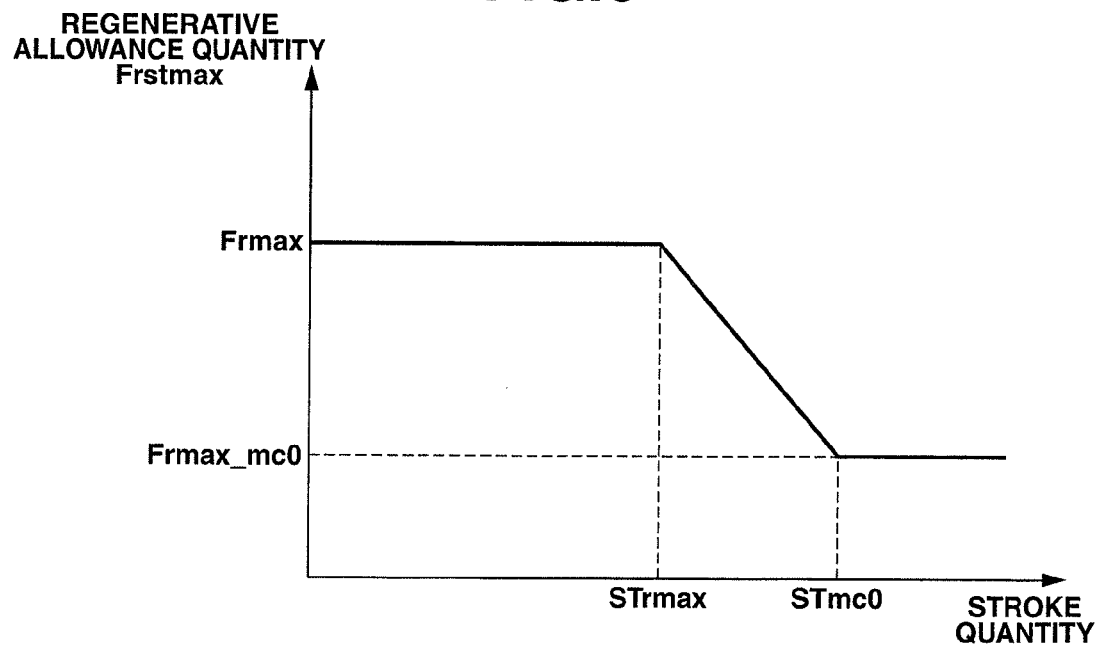
FIG. 6 is a setting map of a regenerative allowance quantity Trstmax in accordance with a pedal suction.

At a step S107, BCU 32 calculates a regenerative allowance quantity Frstmax in accordance with a brake pedal suction (quantity) using the stroke quantity detected by stroke sensor 42. Regenerative allowance quantity Frstmax in accordance with the brake pedal suction (quantity) is set by referring to a map shown in FIG. 6. In FIG. 6, its longitudinal axis denotes regenerative allowance quantity Frstmax in accordance with the brake pedal suction (quantity). Regenerative allowance quantity Frstmax provides maximum regenerative braking force Frmax when the stroke quantity is in a range smaller than STrmax and is decreased at a predetermined gradient in accordance with the increase in the stroke quantity in a range from STrmax to STmc0, and provides Frmax_mc0 when the stroke quantity is in a range exceeding STmc0. It should be noted that Frmax_mc0 is the regenerative braking force (no unpleasant feeling is given to the vehicle driver along with the brake pedal suction) such that no brake pedal suction feeling is given to the vehicle driver along with the reduction in the master cylinder pressure when the switch from the regenerative braking force to the liquid pressure braking force is carried out along with the reduction of the regenerative braking force.

Frmax_mc0 is determined from allowable (no brake pedal suction feeling is given to the vehicle driver) brake pedal suction quantity ΔST, master cylinder cross sectional area Smc, a wheel cylinder consumed liquid quantity characteristic, and a required total braking force Fst_mc0 at stroke quantity STmc0.

Figure 7:
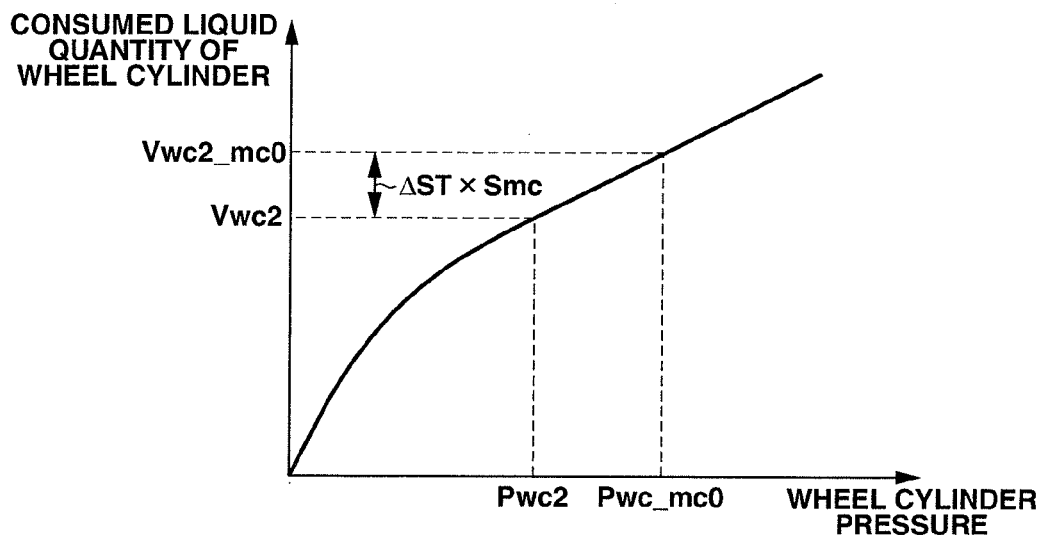
FIG. 7 is a characteristic graph representing a wheel cylinder consumed liquid quantity in the first embodiment.

FIG. 7 shows a wheel cylinder consumed liquid quantity characteristic in the first embodiment.

First, BCU 32 derives a wheel cylinder pressure Pwc_mc0 generating Fst_mc0 and, a post-switch wheel cylinder liquid quantity Vwc_mc0 from the wheel cylinder consumed liquid quantity characteristic. Subsequently, the liquid quantity variation generated according to an allowed suction is ΔST× Smc and Vwc_mc0−ΔST×Smc is derived as an ante-switch wheel cylinder pressure Vwc2. Then, an ante-switch wheel cylinder pressure Pwc2 is again derived from the wheel cylinder consumed liquid pressure characteristic. This Pwc2 is set as liquid pressure braking force Fwc2 and a difference between Fst_mc0 and Fwc2 is set as Frmax_mc0.

At a step S108, BCU 32 compares allowance regenerative braking force Frreq0 with regenerative allowance quantity Frstmax in accordance with the pedal suction (quantity). In order to satisfy required total braking force Freq0 and not to give the brake pedal suction feeling to the vehicle driver, it is necessary to make the generated regenerative braking force equal to or smaller than Frreq0 and equal to or lower than Frstmax. Then, if Frreq0 is larger than Frstmax (Yes) at step S108, the routine goes to a step S109. If No at step S108, the routine goes to a step S110.

At step S109, BCU 32 applies regenerative allowance quantity Frstmax smaller than allowable regenerative braking force Frreq0 to required regenerative braking force Frreq (Frreq←Frstmax).

At step S110, BCU 32 applies allowance regenerative braking force Frreq0 which is equal to or smaller than regenerative allowance quantity Frstmax in accordance with the pedal suction (quantity) to required regenerative braking force Frreq (Frreq←Frreq0).

At a step S111, BCU 32 transmits calculated required regenerative braking force Frreq to MCU 33 via communication line 34.

At a step S112, BCU 32 receives executing regenerative braking force Fr which is the detection value of the actually generated regenerative braking force from MCU 33 via communication line 34.

At a step S113, BCU 32 calculates the difference between required total braking force Freq and executing regenerative braking force Fr such that the sum between the actually generated regenerative braking force and the liquid pressure braking force provides required total braking force Freq (Fwcreq←Freq−Fr).

At a step S114, BCU 32 calculates a target wheel cylinder pressure Pwcreq for each road wheel required to generate required liquid pressure braking force Fwcreq.

At a step S115, BCU 32 calculates control command values for motor M and gate out valve 3 on a basis of target wheel cylinder pressure Pwcreq for each road wheel and carries out a motor actuation procedure and a gate out valve actuation procedure which actuate motor M and gate out valve 3 on a basis of the calculated command values. Then, the routine finally goes to a return.

[Motor and Gate Out Valve Actuation (Operation) Procedure]

Figure 8:
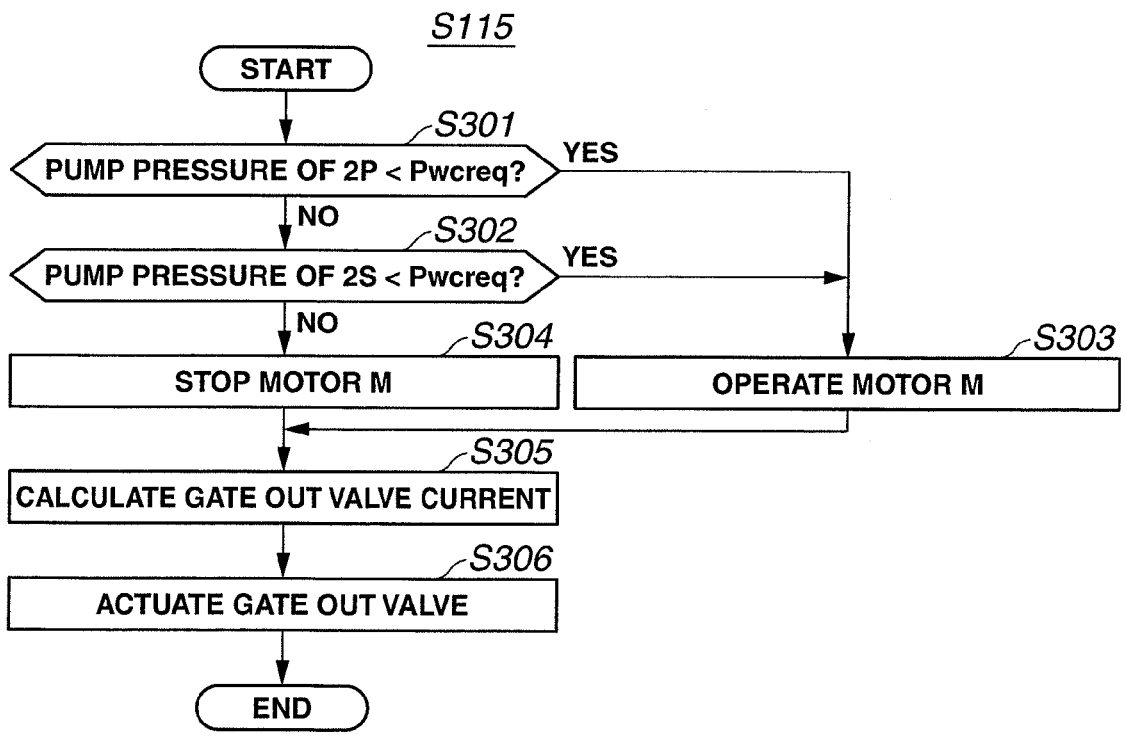
FIG. 8 is a flowchart representing a motor operation process and gate out valve actuation process.
Figure 9A:
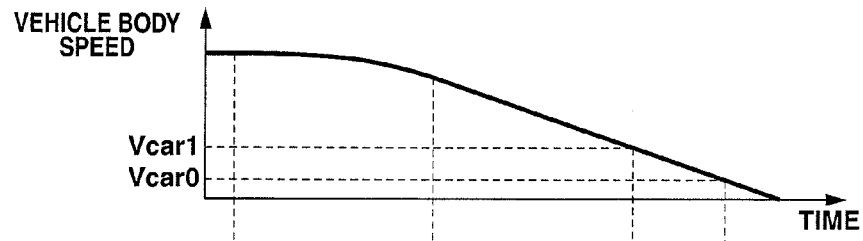
FIGS. 9A through 9G are integrally a timing chart representing a brake pedal depression increase and hold operation in a case where a limitation of a regenerative braking force according to regenerative allowance quantity Frstmax is not carried out.
Figure 9B:
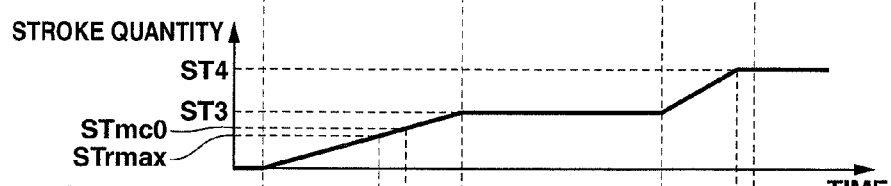
Figure 9C:
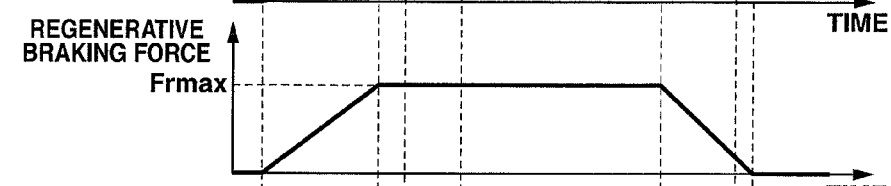
Figure 9D:
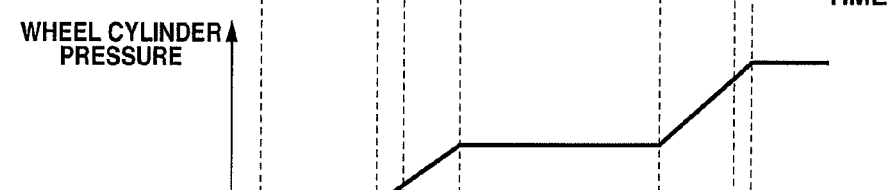
Figure 9E:
Figure 9F:
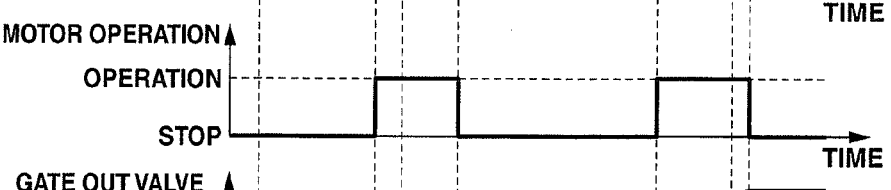
Figure 9G:
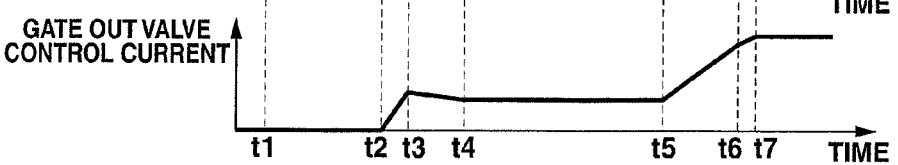
Figure 11A:
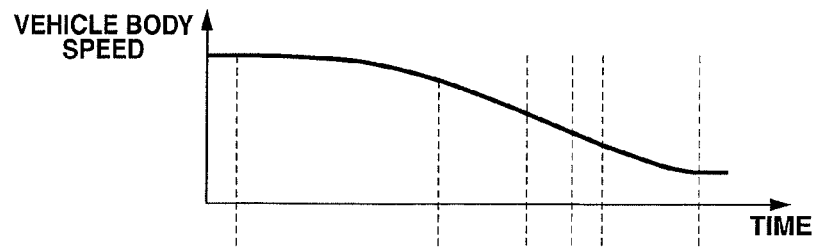
FIGS. 11A through 11G are integrally a timing chart representing a brake pedal depression increase and hold and reduce operation in a case where the limitation of regenerative braking force according to regenerative allowance quantity Frstmax is carried out.
Figure 11B:
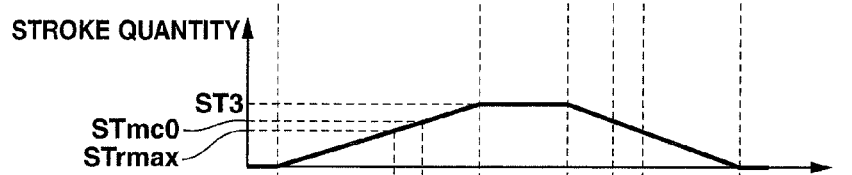
Figure 11C:
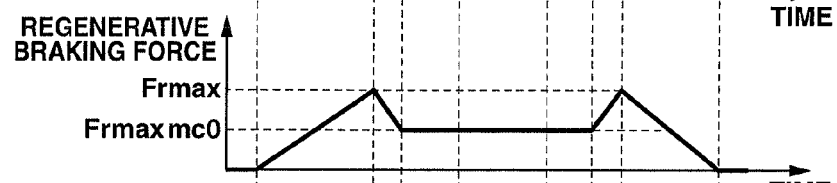
Figure 11D:
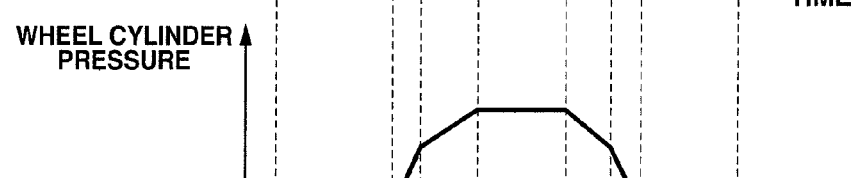
Figure 11E:
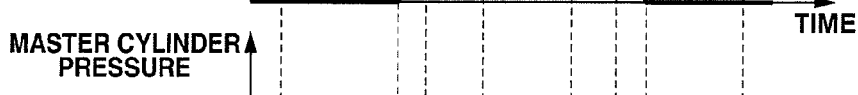
Figure 11F:
Figure 11G:
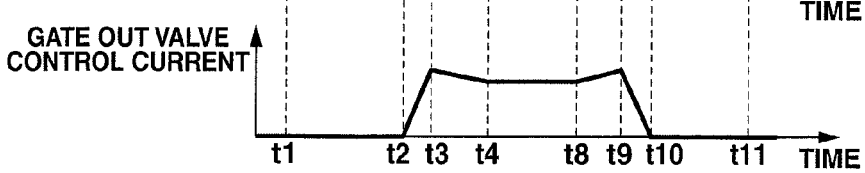

FIG. 8 is a flowchart representing a flow of the motor and gate out valve actuation (operation) procedure executed at step S115 of FIG. 7.

That is to say, at a step S301, BCU 32 compares the detected value of pump pressure sensor 2P with target wheel cylinder pressure Pwcreq. If pump pressure of 2P<Pwcreq (Yes), the subroutine goes to a step S303 in order to increase the pressure of wheel cylinders W/C(FL) and W/C(RR). If pump pressure of 2P≥Pwcreq at step S301 (No), the subroutine goes to a step S302.

At step S302, BCU 32 compares the detected value of pump pressure sensor 2S with target wheel cylinder pressure Pwcreq. If pump pressure of 2S<Pwcreq (Yes), the subroutine goes to step S303 in order to increase the pressure of wheel cylinders W/C(FR) and W/C(RL). If pump pressure of 2S≥Pwcreq at step S302 (No), the subroutine goes to a step S304.

At step S303, BCU 32 executes so as to actuate motor M in order to increase the pressures of any one, any two, any three, or all of wheel cylinders W/C (FL), W/C(FR), W/C(RL), W/C(RR) so that the discharge of the brake liquid is carried out by means of pump P (PP, PS).

At step S304, BCU 32 is executed not to actuate motor M (stop motor M) since it is not necessary to increase the wheel cylinder pressures of any of four road wheels.

At a step S305, BCU 32 calculates the control current of gate out valve 3 (3P, 3S). A first current is derived from the difference between the detected value of master cylinder pressure sensor 35 and target wheel cylinder pressure Pwcreq, the first current is increased and decreased according to its necessity from the detected value of pump pressure sensor 2 (2P, 2S) to provide the control current for gate out valve 3 (3P, 3S). At step S306, gate out valve 3 (3P, 3S) is driven (actuated) on a basis of control current of gate out valve 3 (3P, 3S) derived at step S305.

Next, an action of the control apparatus in the first embodiment will be described below.

As a comparative example to the regeneration coordinative control in the first embodiment, a brake depression increase-and-hold operation will be described in a case where the limitation of the regenerative braking force through regenerative allowance quantity Frsmax is not carried out.

FIGS. 9A through 9G are integrally a timing chart representing the brake depression increase-and-hold of the vehicle driver in a case where no limitation of the regenerative braking force through regenerative allowance quantity Frstmax as in the first embodiment is carried out.

The vehicle driver starts to stroke brake pedal BP at a time point t1 and maintains the stroke quantity of brake pedal BP at a constant depression force after a time point t4.

At this time, the stroke quantity is smaller than stroke quantity STrmax which provides maximum regenerative braking force Frmax until a time point t2. Thus, the braking is performed only by the regenerative braking force.

After time point t2, the stroke quantity is increased and has exceeded STrmax. Thus, the liquid pressure braking force according to the wheel cylinder pressure is generated so that an insufficient braking force only by the regenerative braking force with respect to the braking force required for the vehicle is compensated. At this time, motor M is actuated and the current of gate out valve 3 is controlled so as to enable the holding of the target wheel cylinder pressure.

Furthermore, in a case where brake pedal BP is stroked equal to or larger than the stroke quantity by which the master cylinder pressure is developed, the master cylinder pressure starts to be increased. At a time point of t4, the vehicle driver holds brake pedal BP at a stroke quantity ST3. At this time, the wheel cylinder pressure is held. Hence, motor M is stopped.

When, at a time point t5, the vehicle speed is decreased and is lower than a vehicle speed Vcar1 at which the generable regenerative braking force is started to be decreased, the regenerative braking force is continued to be decreased. Although the wheel cylinder pressure is increased in order to compensate for the decrease in the generated braking force due to the reduction in the regenerative braking force, the master cylinder pressure is decreased due to the supply of the brake liquid of master cylinder to wheel cylinder W/C (wheel cylinder pressures W/C(FR), W/C(FL), W/C(RR), W/C (RL)). Hence, the reaction force of brake pedal BP is reduced. Since the vehicle driver depresses brake pedal BP by the depression quantity corresponding to the decrease quantity of the brake liquid in the master cylinder so that the pedal suction is developed. The pedal depression is continued up to a time point t6 at which the master cylinder pressure is zero. Suction (stroke) quantity ST4-ST3 from time point t5 to time point t6 is determined according to the decrease quantity of master cylinder pressure M/C at a time at which the vehicle speed has reduced and reached to Vcar1.

FIGS. 10A through 10G are integrally a timing chart representing the brake depression increase-and-hold operation in a case where the limitation of the regenerative braking force according to regenerative allowance quantity Frstmax in the first embodiment is carried out. In FIGS. 10A through 10G, each dot-and-dash line denotes the operation in the case of the comparative example shown in FIGS. 9A through 9G.

It should be noted that the driver's operation is the same as the case of FIGS. 9A through 9G, namely, the driver starts to depress brake pedal BP by the stroke quantity from time point t1 and maintains the stroke quantity of brake pedal BP at the constant depression force after time point t4.

The contents of timing charts until time point t2 are mutually the same as those shown in FIGS. 9A through 9G and shown in FIGS. 10A through 10G, the detailed explanations thereof will herein be omitted.

After time point t2, the regenerative braking force in accordance with the stroke quantity of brake pedal BP is limited on a basis of regenerative allowance quantity Frstmax shown in FIG. 6 and the wheel cylinder pressure is increased to generate the liquid pressure braking force corresponding to the limited regenerative braking force.

At a time point t5', the regenerative braking force is started to be decreased along with the reduction in the vehicle speed. In order to compensate for this reduction of the regenerative braking force, the wheel cylinder pressure is increased. At this time, the pedal suction is developed due to the reduction in the master cylinder pressure. However, suction (stroke) quantity ST4'-ST3 is smaller than ST4-ST3 shown in FIGS. 9A through 9G. Thus, no unpleasant feeling such that the brake pedal suction feeling is not given to the vehicle driver since reduction quantity ST4'-ST3 is smaller than ST4-ST3. Consequently, the vehicle driver does not give the brake pedal suction feeling.

FIGS. 11A through 11G integrally show a timing chart representing the vehicle driver depression increase and returning operation in a case where the limitation of the regenerative braking force according to regenerative allowance quantity Frstmax in the first embodiment is carried out.

The vehicle driver starts to stroke brake pedal BP from time point t1, maintains the stroke quantity of brake pedal BP at the constant depression force, and separates brake pedal BP at a time interval from time point t8 to time point t11. Until time point t8, the same control contents are carried out in the case of FIGS. 10A through 10G. The regenerative braking force is increased on a basis of regenerative allowance quantity Frstmax shown in FIG. 6 in order to relieve the limitation of the regenerative braking force in accordance with the stroke quantity of brake pedal BP. On the other hand, in order to perform the reduction in the liquid pressure braking force corresponding to the reduction in the braking force along with the increased regenerative braking force and the reduction in the stroke, the current of gate out valve 3 and the wheel cylinder pressure are reduced. At the time interval from time point t10 to time point t11, the stroke quantity is lower than stroke quantity STrmax at which the regenerative braking force is at the maximum. Hence, the braking is performed only by the regenerative braking force

[Regenerative Braking Force Limitation Action by Means of Regenerative Allowance Quantity]

The pedal reaction force of brake pedal BP is created by means of the pressure of the master cylinder (master cylinder pressure). In a case where the vehicle driver depresses the brake pedal at the constant depression force and in a case where the reaction force of brake pedal BP is reduced, the driver strokes brake pedal BP by the depression quantity corresponding to the reduction in the pedal reaction force. Consequently, the brake pedal suction feeling is developed as described hereinabove. Incidentally, it is necessary to decrease the regenerative braking force when the vehicle speed is decreased. At this time, it is necessary to perform the pressure increase of the wheel cylinder so as to obtain the liquid pressure braking force corresponding to the regenerative braking force which is decreased in order to maintain the braking force required for the vehicle. At this time, to supply the brake liquid in the master cylinder to the wheel cylinder, the master cylinder pressure is decreased. As the pressure decrease quantity becomes increased, the quantity of the brake pedal suction becomes increased. Hence, the unpleasant feeling that the driver gives becomes increased.

In the previously proposed control apparatus for the vehicle described in the BACKGROUND OF THE INVENTION, the decrease speed of the pedal reaction force is suppressed by the limitation of the increase speed of the liquid pressure braking force when the switch from the regenerative braking force to the liquid pressure braking force along with the reduction in the regenerative braking force is carried out. However, even if the pedal suction speed is reduced, the pedal suction quantity is not reduced. Hence, during the decrease in the regenerative braking force equal to or larger than a case of a large quantity to some degree, the feeling of the pedal suction is given to the vehicle driver.

On the other hand, in the control apparatus for the vehicle in the first embodiment, BCU 32 limits the regenerative braking force on regenerative allowance quantity Frstmax with a value of regenerative allowance quantity Frstmax smaller than maximum regenerative braking force Frmax in a case where the stroke quantity of brake pedal BP is equal to or larger than maximum regenerative quantity Frmax. Thus, the increase pressure quantity for the respective wheel cylinders W/C(FL) through W/C(RR) when the switch from the regenerative braking force to the liquid pressure braking force is made along with the reduction in the regenerative braking force can be decreased than the corresponding pressure increase quantity therefor in a case where no limitation is made for the regenerative braking force. Hence, the decrease quantity of the master cylinder pressure can be made smaller and pedal suction quantity ΔST can be suppressed so that the unpleasant brake pedal suction feeling that the driver gives can be reduced.

BCU 32, while decreasing the regenerative braking force up to regenerative allowance quantity Frstmax, increases the liquid pressure braking force to realize the braking force required for the vehicle. Hence, at the same time when the braking force required for the vehicle can be secured, the regenerative braking force can compatibly be decreased.

BCU 32 sets regenerative allowance quantity Frstmax on a basis of a detection value of stroke sensor 42 which detects the stroke quantity of brake pedal BP. BCU 32 sets regenerative allowance quantity Frstmax on a basis of a stroke quantity of brake pedal BP since a master cylinder state, namely, the master cylinder pressure is varied in accordance with the stroke quantity of brake pedal BP so that the regenerative braking force can be limited at a timing earlier than the variation in the master cylinder pressure and the brake pedal suction feeling along with the pressure reduction of the master cylinder can more assuredly be reduced.

Master cylinder M/C in the first embodiment is a stroke dependent (corresponding) master cylinder such that the rise gradient of the master cylinder pressure with respect to the stroke quantity is large in a case where the stroke quantity is equal to or larger than STmc0 which is larger than STrmax and the master cylinder pressure is not generated with respect to the stroke quantity in a case where the stroke quantity is smaller than STmc0. Hence, in a case where, while the stroke quantity is increased and has reached to STrmax, the braking force required for the vehicle can be achieved only by the regenerative braking force, the liquid pressure braking force can be zeroed without the actuation of each electromagnetic switching valve in HU 31. Thus, an actuation (operation) frequency of each electromagnetic switching valve can be suppressed and a durability thereof can be achieved.

In addition, in a case where the stroke quantity is smaller than STrmax, the regenerative braking force is not limited with regenerative allowance quantity Frstmax as maximum regenerative braking force Frmax. However, in a case where the switch of the maximum regenerative braking force to the liquid pressure braking force Frmax is made along with the reduction in the regenerative braking force, the pressure increase quantity for the respective wheel cylinders becomes increased. As against this, the master cylinder pressure is zeroed. Pedal suction quantity ΔST is accordingly zero so that the brake pedal suction per se can be prevented from being developed.

BCU 32 compares regenerative allowance quantity Frstmax which accords with the pedal suction with allowance regenerative braking force Frreq0 which is the maximum regenerative braking force satisfying required total braking force Freq and transmits one of these values of Frreq0 and Frstmax which is smaller than the other as required regenerative braking force Frreq to MCU 33. Thus, MCU 33 can reduce the regenerative braking force generated by MG 36 up to required regenerative braking force Frreq.

Since the regenerative brake unit is set to generate maximum regenerative braking force Frmax previously set when the stroke quantity of brake pedal BP is STrmax. Hence, when brake pedal BP is depressed, the regenerative braking force can be increased up to maximum regenerative braking force Frmax before the master cylinder pressure is raised. Thus, an improvement in the energy collection efficiency can be achieved.

Next, advantages in the case of the first embodiment of the control apparatus for the vehicle will be described below.

(1) There is provided the control apparatus for the vehicle in the first embodiment including: a regenerative brake unit (MCU 33, MG 36, INV 37, and BAT 38) to obtain the calculated regenerative braking force for the road wheels; a master cylinder M/C actuated in accordance with the driver's brake manipulated variable; a liquid pressure brake unit (HU31, BCU32) having a pump to obtain the liquid pressure braking force calculated by supplying the brake liquid sucked from master cylinder M/C to wheel cylinder W/C installed on each road wheel under pressure to obtain the calculated liquid pressure braking force, the regenerative brake unit, the master cylinder, and the liquid pressure brake unit being provided to obtain a driver's demanded braking force calculated on a basis of a brake manipulation by the vehicle driver; and BCU 32 which includes: a stroke sensor 42 configured to detect the stroke quantity of brake pedal BP; a first regenerative braking force calculating section 32a configured to calculate required regenerative braking force Frreq limited according to regenerative allowance quantity Frstmax (maximum regenerative braking force Frmax) in a case where the stroke quantity is smaller than STrmax; a second regenerative braking force calculating section 32b configured to calculate required regenerative braking force Frreq limited by regenerative allowance quantity Frstmax smaller than maximum regenerative braking force Frmax in a case where the stroke quantity is equal to or larger than STrmax; and braking control section 32c configured to calculate the difference between required total braking force Freq and executing collective braking force Fr as required liquid pressure braking force Fwcreq which is the braking force required for the vehicle such that a sum between executing regenerative braking force Fr which is the detection value of the regenerative braking force actually generated on a basis of required regenerative braking force Frreq and the liquid pressure braking force provides required total braking force Freq.

Thus, the brake pedal suction feeling that the driver gives (the driver's unpleasant feeling) (the brake pedal suction quantity given to the vehicle driver) can be reduced.

(2) BCU 32 includes switch control section 32d configured to decrease required generative braking force Frreq and to realize required total braking force Freq to increase the liquid pressure braking force, at the same time when the stroke quantity is changed from STrmax to STmc0.

Hence, at the same time when the braking force (required braking force Freq) for the vehicle can be secured, the regenerative braking force can compatibly be decreased.

(3) BCU 32 sets regenerative allowance quantity Frstmax on a basis of the stroke quantity of brake pedal BP detected by means of stroke sensor 42.

Hence, the regenerative braking force can be limited at the timing earlier than the variation in the master cylinder pressure so that the brake pedal suction feeling along with the master cylinder pressure reduction can more positively be reduced.

(4) Master cylinder M/C is the stroke responsive master cylinder such that, in a case where the stroke quantity is equal to or larger than STmc0, the rise gradient of the master cylinder pressure with respect to the stroke quantity is large and, in a case where the stroke quantity is smaller than STmc0, the rise gradient of the master cylinder pressure with respect to the stroke quantity is small. It should be noted that STrmax is equal to or smaller than STmc0.

In a case where the braking force required for the vehicle only by means of the regenerative braking force can be achieved while the stroke quantity has reached to STrmax, the liquid pressure braking force can be zeroed without actuation of each electromagnetic switching valve of HU 31. Hence, the operation frequency of each electromagnetic switching valve can be suppressed and the durability can accordingly be improved.

(5) BCU 32 transmits required regenerative braking force Frreq to MCU 33.

Hence, the regenerative braking force generated in MG 36 can be reduced to required regenerative braking force Frreq by means of MCU 33.

Second Embodiment

In a second preferred embodiment of the control apparatus for the vehicle according to the present invention, a difference point from the first embodiment is that the regenerative braking force is limited on a basis of the master cylinder pressure. The other structure is the same as the first embodiment. For the same structure as the first embodiment, the detailed description thereof will herein be omitted.

First regenerative braking force calculating section 32a calculates a required regenerative braking force (first regenerative braking force) Frreq limited by regenerative allowance quantity Frpmcmax in a case where the master cylinder pressure detected by master cylinder pressure sensor 35 is smaller than Pmc3.

Second regenerative braking force calculating section 32b calculates required regenerative braking force (second regenerative braking force) Frreq limited by regenerative allowance quantity Frpmcmax in a case where the master cylinder pressure detected by master cylinder pressure sensor 35 is equal to or larger than Pmc3.

It should be noted that regenerative allowance quantity Frpmcmax provides maximum regenerative braking force Frmax in a case where master cylinder pressure is smaller than Pmc3 and is smaller than maximum regenerative braking force Frmax in a case where the master cylinder pressure is equal to or larger than Pmc3.

Thus, required regenerative braking force Frreq calculated by means of second regenerative braking force calculating section 32b is smaller than required regenerative braking force Frreq calculated by first regenerative braking force calculating section 32a. It should be noted that the calculation method of regenerative allowance quantity Frpmcmax will be described in details later.

Braking control section 32c calculates the difference between required total braking force Freq and executing regenerative braking force Fr as required liquid pressure braking force Fwcreq such that the sum between executing regenerative braking force Fr which is the detection value of the actually generated regenerative braking force on a basis of required regenerative braking force Frreq and the liquid pressure braking force provides required total baking force Freq which is the required braking force for the vehicle.

Switch control section 32d decreases required regenerative braking force Frreq and increases the liquid pressure braking force to realize required total braking force Freq while the master cylinder pressure indicates from Pmc3 to Pmc4.

[Regenerative Coordinated Control Procedure]

Figure 12:
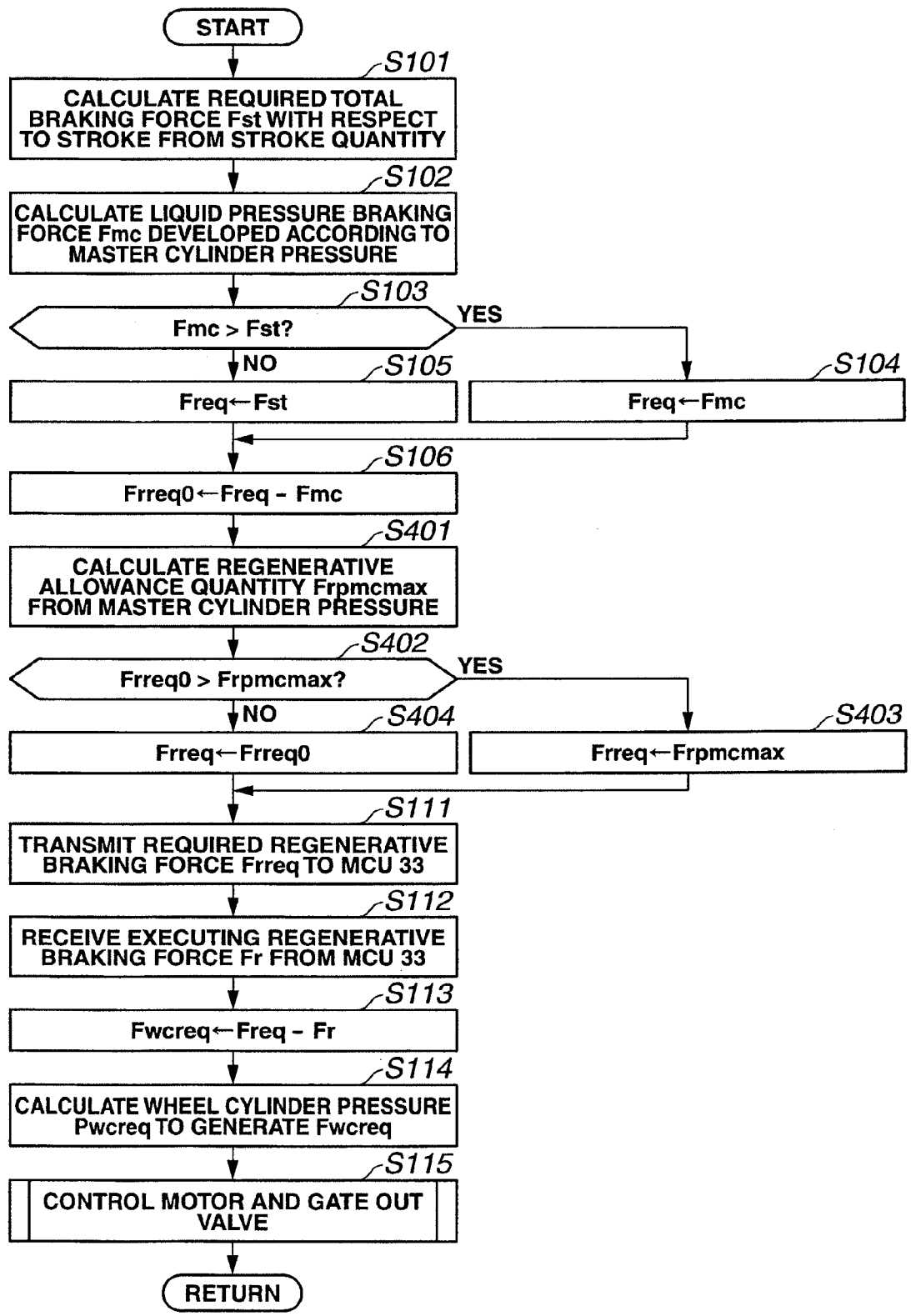
FIG. 12 is a flowchart representing a flow of a regenerative coordinative control procedure executed by BCU 32 in a second preferred embodiment.

FIG. 12 shows a flowchart representing a regenerative coordinated control procedure executed in BCU 32 in the second embodiment. It should be noted that the same steps as are carried out in the flowchart shown in FIG. 4 designate like reference numerals and the explanations thereof will, herein, be omitted.

Figure 13:
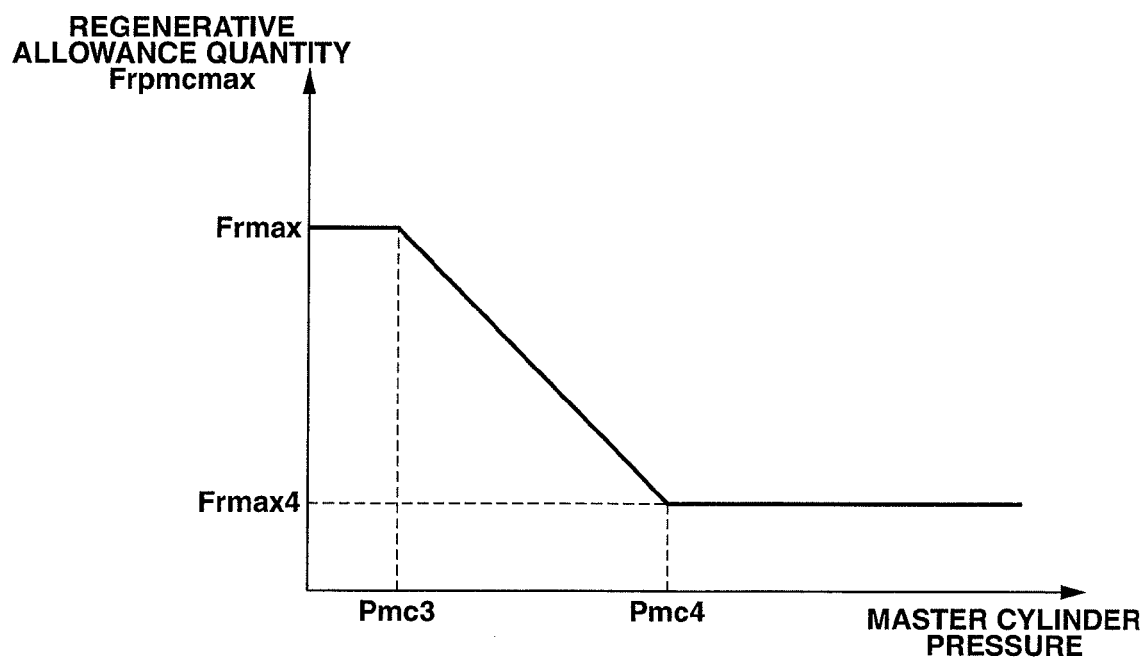
FIG. 13 is a setting map representing a regenerative allowance quantity Frpmcmax which accords with a master cylinder pressure.

At a step S401, BCU 32 calculates regenerative allowance quantity Frpmcmax in accordance with the pedal suction using the master cylinder pressure detected by means of master cylinder pressure sensor 35 (master cylinder state variable detecting section or brake manipulated variable detecting section). Regenerative allowance quantity Frpmcmax in accordance with the brake pedal suction is set by referring to a map shown in FIG. 13. That is to say, regenerative allowance quantity Frpmcmax at a master cylinder pressure Pmc3 that does not give the brake pedal suction feeling is at least equal to or larger than maximum regenerative braking force Frmax. At a master cylinder pressure Pmc4 that the vehicle driver gives the brake pedal suction feeling for brake pedal BP along with the switch between regenerative braking force and the liquid pressure braking force, regenerative allowance quantity Frpmcmax provides a characteristic which is equal to or smaller than regenerative braking force Frmax4 that does not give the brake pedal suction feeling due to the switch. It should be noted that, if regenerative allowance quantity Frpmcmax is largely decreased against the increase in the master cylinder pressure, the increase gradient of the liquid braking force at the time of switch becomes large so that the brake pedal suction feeling is given to the driver. Therefore, the decrease gradient of regenerative allowance quantity Frpmcmax with respect to the increase in the master cylinder pressure is equal to or smaller than a predetermined quantity that does not give the brake pedal suction feeling to the driver. Or alternatively, the brake pedal suction feeling may be reduced by a direct limitation of the increase gradient of the liquid pressure braking force with respect to time or by an indirect limitation of the increase gradient of the liquid pressure braking force according to the limitation of the decrease gradient of the regenerative braking force with respect to time.

At a step S402, BCU 32 compares allowable regenerative braking force Frreq0 with regenerative allowance quantity Frpmcmax in accordance with the pedal suction (quantity). In order to satisfy required total braking force Freq and not to give the brake pedal suction feeling to the vehicle driver, it is necessary for the generated regenerative braking force to be equal to or smaller than Frreq0 and to be equal to or smaller than Frpmcmax. Then, if Frreq0>Frpmcmax, the routine goes to a step S403. If not so, the routine goes to a step S404.

At step S403, BCU 32 applies regenerative allowance quantity Frpmcmax which is smaller than allowance regenerative braking force Frreq0 as required regenerative braking force Frreq.

At step S404, BCU 32 applies allowance regenerative braking force Frreq0 as required regenerative braking force Frreq which is equal to or smaller than regenerative allowance quantity Frpmcmax in accordance with the suction.

Next, the action of the control apparatus for the vehicle in the second embodiment will be described below. In the second embodiment, regenerative allowance quantity Frpmcmax on a basis of the master cylinder pressure. The master cylinder pressure is varied in accordance with the stroke quantity of brake pedal BP. Hence, the development of the master cylinder pressure is always delayed with respect to the stroke quantity. Thus, in the second embodiment, the timing at which the regeneration limitation is determined is delayed as compared with the case of the first embodiment. However, since the regenerative braking force is limited on a basis of the master cylinder pressure having the direct relationship to the brake pedal suction feeling so that the maximum regenerative braking force can be generated in a range such that no brake pedal suction feeling is given to the vehicle driver.

In other words, as compared with the first embodiment, a larger regenerative braking force can be generated so that the energy collection efficiency can be increased.

Next, advantages in the second embodiment will be described below.

The control apparatus for the vehicle in the second embodiment gives the following advantages:

(1) In the control apparatus for the vehicle including: a regenerative brake unit (MCU 33, MG 36, INV 37, and BAT 38) configured to obtain the calculated regenerative braking force for the road wheels; a master cylinder M/C actuated in accordance with the driver brake manipulated variable; and a liquid pressure brake unit (HU31, BCU32) having a pump to obtain the liquid pressure braking force calculated by supplying the brake liquid sucked from master cylinder M/C to wheel cylinder W/C installed on each road wheel under pressure to obtain the calculated liquid pressure braking force, BCU 32 is provided which comprises: a master cylinder pressure sensor 35 configured to detect a master cylinder pressure; first generative braking force calculating section 32a configured to calculate required regenerative braking force Frreq limited by regenerative allowance quantity Frpmcmax (maximum regenerative braking force Frmax) in a case where the master cylinder pressure is smaller than Pmc3; second regenerative braking force calculating section 32b configured to calculate required regenerative braking force Frreq limited by regenerative allowance quantity Frpmcmax smaller than maximum regenerative braking force Frmax in a case where the master cylinder is pressure is equal to or larger than Pmc3; braking control section 32c configured to calculate the difference between required total driving force Freq and executing regenerative driving force Fr such that the sum between executing regenerative braking force Fr which is the detection value of the regenerative braking force actually generated on a basis of required regenerative braking force Frreq and the liquid pressure braking force gives required total braking force Freq which is the braking force required for the vehicle. Consequently, the brake pedal suction (feeling) given to the vehicle driver can be reduced.

(2) BCU 32 is provided with switch control section 32d configured to decrease required regenerative braking force Frreq to increase the liquid pressure braking force while the master cylinder pressure indicates from Pmc3 to Pmc4.

Thus, at the same time when the braking force required for the vehicle (required braking force) can be secured, the regenerative braking force can compatibly be reduced.

(3) BCU 32 sets regenerative allowance quantity Frpmcmax on a basis of the master cylinder pressure detected by master cylinder pressure sensor 35.

Thus, the maximum regenerative braking force can be generated without giving the brake pedal suction feeling to the vehicle driver and the energy collection efficiency can be increased.

(4) BCU 32 calculates maximum regenerative braking force Frmax as regenerative allowance quantity Frpmcmax in a case where the master cylinder pressure is smaller than Pmc3.

Thus, in a case where the braking force required for the vehicle can be achieved only by means of the liquid pressure braking force according to the master cylinder and the regenerative braking force during the time interval at which the master cylinder pressure has reached to Pmc3, each electromagnetic valve of HU 31 can be deactivated (not operated). Thus, the operation frequency of each electromagnetic valve can be suppressed and the improvement of the durability can be improved.

(5) BCU 32 transmits required regenerative braking force Frreq to MCU 33.

Hence, the regenerative braking force generated by MG 36 can be reduced to required regenerative braking force Frreq by MCU 33.

Other Preferred Embodiments

As described hereinabove, the control apparatus for the vehicle according to the present invention has been explained on a basis of the preferred embodiments with reference to the drawings. However, the present invention is not limited to the preferred embodiments and various changes and modifications can be made without departing from the spirit and scope of the present invention.

For example, in the first and second embodiments, the switch between the regenerative braking force by means of the regenerative brake unit and the liquid braking force by means of the liquid pressure control unit is carried out in the brake control unit (BCU). However, this switch may be carried out in the motor control unit (MCU).

In each of the first and second embodiments, the pressure of each wheel cylinder is deemed to be equal to one another. A pressure difference between each wheel cylinder may be derived in accordance with a magnitude of the required liquid pressure braking force and a vehicular motion.

In each of the preferred embodiments, the vehicle is a type of the vehicle in which the engine drives the left and right front road wheels and the motor/generator drives the left and right rear road wheels. However, the present invention is applicable to the type of vehicle in which the regenerative brake unit and the liquid pressure brake unit are equipped.

In each of the preferred embodiments, the calculation is made with the braking force as a unit. However, in the present invention, the calculation may be made with a pressure, a torque, and/or a deceleration as a unit.

In the first embodiment, the regenerative braking force is limited on a basis of the stroke of the brake pedal. However, the regenerative braking force may be limited on a basis of the deceleration developed according to the brake pedal stroke.

In the second embodiment, the regenerative braking force is limited on a basis of the master cylinder pressure. However, the regenerative braking force may be limited on a basis of a combination of a primary determination according to the pedal stroke and a secondary determination according to master cylinder pressure.

Next, technical ideas of the invention other than independent claim 1 and graspable from the preferred embodiments will be described below.

(a) The control apparatus as claimed in claim 3, wherein the control apparatus is set to generate a preset maximum regenerative braking force when the brake manipulated variable is the predetermined brake manipulated variable.

Thus, the regenerative braking force can be increased up to a maximum regenerative braking force before the rise in the master cylinder pressure so that the improvement in the energy collection efficiency can be improved.

(b) The control apparatus for the vehicle as claimed in claim 2, wherein the first regenerative braking force is a preset maximum regenerative braking force generated by the regenerative brake unit.

Thus, the regenerative braking force can be increased up to a maximum regenerative braking force before the rise in the master cylinder pressure so that the improvement in the energy collection efficiency can be improved.

(c) The control apparatus for the vehicle as claimed in claim 2, wherein the switch control section determines a decrease gradient of the second regenerative braking force per unit time on a basis of an increase gradient of the calculated liquid pressure braking force per unit time.

Thus, the brake pedal suction feeling developed due to the abrupt decrease in the master cylinder pressure can be suppressed.

(d) The control apparatus for the vehicle as claimed in claim 3, wherein the brake manipulated variable detecting section is a stroke sensor configured to detect a stroke of a brake pedal.

Thus, the regenerative braking force can be limited at the earlier timing than the variation in the master cylinder pressure so that the brake pedal suction feeling along with the pressure decrease of the master cylinder can accurately be reduced.

(e) The control apparatus for the vehicle as claimed in claim 3, wherein the brake manipulated variable detecting section is a master cylinder pressure sensor configured to detect the pressure within the master cylinder.

Thus, the maximum regenerative braking force can be generated and the energy collection efficiency can be increased in a range in which the brake pedal suction feeling is not given to the vehicle driver.

(f) A control apparatus for a vehicle, comprising: a regenerative brake unit configured to obtain a regenerative braking force based on a calculated regenerative braking force command value for road wheels; a master cylinder actuated in accordance with a brake manipulated variable of the driver; a liquid pressure brake unit having a pump to supply a brake liquid sucked from the master cylinder to wheel cylinders installed on the respective road wheels under pressure to obtain a liquid pressure braking force based on a calculated liquid pressure braking force command value, the regenerative brake unit, the master cylinder, and the liquid pressure brake unit being provided to obtain a driver's demanded braking force calculated on a basis of a brake manipulation by the vehicle driver; and a control unit including: a brake manipulated state variable detecting section configured to detect a brake manipulated state variable related to a brake manipulation state of the driver; a first regenerative braking force command value calculating section configured to calculate a first regenerative braking force command value when the brake manipulation state variable detected by the brake manipulation state variable detecting section is smaller than a predetermined state variable; a second regenerative braking force command value calculating section configured to calculate a second regenerative braking force command value which is smaller than the first regenerative braking force command value when the brake manipulation state variable detected by the brake manipulation state variable is equal to or larger than the predetermined state variable; and a braking control section configured to increase the liquid pressure braking force command value when the brake manipulation state variable detected by the brake manipulation state variable detecting section is equal to or larger than the predetermined state variable.

Thus, the pressure increase quantity of the wheel cylinders at a time when the switch from the regenerative braking force to the liquid pressure braking force along with the decrease in the regenerative braking force can be decreased than the pressure increase quantity thereof when no limitation on the regenerative braking force command value is placed. Thus, the master cylinder pressure decrease quantity can be decreased and the brake pedal suction quantity can be suppressed. Thus, the pedal suction feeling that the vehicle driver gives can be reduced.

(g) The control apparatus for the vehicle as set forth in item (f), wherein the control unit includes: a switch control section configured to increase the liquid pressure braking force while decreasing the calculated second regenerative braking force to realize the driver's demanded braking force.

Thus, at the same time when the braking force required for the vehicle can be secured, the second regenerative braking force command value can compatibly be decreased.

(h) The control apparatus for the vehicle as set forth in item (g), wherein the switch control section determines a decrease gradient of the second regenerative braking force command value per unit time on a basis of an increase gradient of the calculated liquid pressure braking force command value per unit time.

Thus, since the decrease gradient of the master cylinder pressure is accordingly made small, the unpleasant feeling of the brake pedal suction given to the vehicle driver can be suppressed.

(i) The control apparatus for the vehicle as set forth in item (g), wherein the brake manipulated variable detecting section is a stroke sensor configured to detect a stroke quantity of a brake pedal.

(j) The control apparatus for the vehicle as set forth in item (g), wherein the master cylinder is a stroke corresponding master cylinder in which a rise gradient of a master cylinder pressure with respect to a variation quantity of a brake stroke is largely generated in a case where a brake stroke quantity is equal to or larger than a first stroke quantity and the rise gradient of the master cylinder pressure with respect to the variation quantity of the brake stroke is small in a case where the brake stroke quantity is smaller than the first stroke quantity and the predetermined state variable is a brake stroke quantity equal to or smaller than the first stroke quantity.

Thus, in a case where the braking force required for the vehicle can be achieved only by means of the regenerative braking force while the stroke quantity has reached to the first stroke quantity, the liquid pressure braking force can be zeroed without operation of the liquid pressure brake unit. Then, the operation frequency of the liquid pressure brake unit can be suppressed and the improvement in the durability can be achieved.

In addition, in a case where the stroke quantity is smaller than the first stroke quantity, the master cylinder pressure is zero. Thus, the brake pedal suction quantity can be zeroed and the development of the brake pedal suction per se can be prevented.

(k) The control apparatus for the vehicle as set forth in item (g), wherein the first regenerative braking force command value is a preset maximum regenerative braking force generated by the regenerative brake unit.

Thus, the regenerative braking force can be increased up to the maximum regenerative braking force before the master cylinder pressure rises. Then, the improvement in the energy collection efficiency can be achieved.

(l) The control apparatus for the vehicle as set forth in item (k), wherein the regenerative brake unit is set to generate a preset maximum regenerative braking force in a case where the brake stroke quantity is a predetermined stroke quantity.

Thus, the regenerative braking force can be increased up to the maximum regenerative braking force before the master cylinder pressure rises. Then, the improvement in the energy collection efficiency can be achieved.

(m) A control apparatus for a vehicle, comprising: a regenerative brake unit configured to obtain a regenerative braking force based on a calculated regenerative braking force command value for road wheels; a liquid pressure brake unit to obtain a liquid pressure braking force, the liquid pressure brake unit being configured to supply a brake liquid sucked from a master cylinder actuated in accordance with the brake manipulated variable of a vehicle driver to wheel cylinders installed on the respective road wheels to obtain the liquid pressure braking force based on the calculated liquid pressure braking force, the regenerative brake unit, the master cylinder, and the liquid pressure brake unit being provided to obtain a driver's demanded braking force calculated on a basis of a brake manipulation by the vehicle driver; a brake manipulation stroke quantity sensor configured to detect a brake manipulated stroke quantity of the vehicle driver; a first regenerative braking force command value calculating section configured to calculate a first regenerative braking force command value when the stroke quantity detected by the brake manipulation stroke quantity sensor is smaller than a predetermined stroke quantity; a second regenerative braking force command value calculating section configured to calculate a second regenerative braking force command value which is smaller than the first regenerative braking force command value when the stroke quantity detected by the brake manipulation stroke quantity sensor is equal to or larger than the predetermined stroke quantity; and a braking control section configured to increase the liquid pressure braking force command value and decrease the second regenerative braking force command value to generate the driver's demanded braking force when the stroke quantity detected by the brake manipulation stroke quantity sensor is equal to or larger than the predetermined stroke quantity.

Thus, the pressure increase quantity of the wheel cylinders at a time when the switch from the regenerative braking force to the liquid pressure braking force along with the decrease in the regenerative braking force can be decreased than the pressure increase quantity thereof when no limitation on the regenerative braking force command value is placed. Thus, the master cylinder pressure decrease quantity can be decreased and the brake pedal suction quantity can be suppressed. Thus, the pedal suction feeling that the vehicle driver gives can be reduced.

(n) The control apparatus for the vehicle as set forth in item (m), wherein the master cylinder is equipped with a master cylinder pressure limiting section configured to raise a master cylinder pressure when the stroke quantity is equal to or larger than a first stroke quantity and to limit a rise in the master cylinder pressure and the predetermined stroke quantity is equal to or smaller than the first stroke quantity.

Thus, in a case where the braking force required for the vehicle can be achieved only by means of the regenerative braking force while the stroke quantity has reached to the first stroke quantity, the liquid pressure braking force can be zeroed without operation of the liquid pressure brake unit. Then, the operation frequency of the liquid pressure brake unit can be suppressed and the improvement in the durability can be achieved.

In addition, in a case where the stroke quantity is smaller than the first stroke quantity, the master cylinder pressure is zero. Thus, the brake pedal suction quantity can be zeroed and the development of the brake pedal suction per se can be prevented.

(o) The control apparatus for the vehicle as set forth in item (n), wherein the regenerative brake unit is set to generate a preset maximum regenerative braking force in a case where the stroke quantity is the first stroke quantity.

Thus, the regenerative braking force can be increased up to the maximum regenerative braking force before the master cylinder pressure rises. Then, the improvement in the energy collection efficiency can be achieved.

This application is based on a prior Japanese Patent Application No. 2011-157728 filed in Japan on Jul. 19, 2011. The entire contents of this Japanese Patent Application No. 2011-157728 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A control apparatus for a vehicle, comprising:
a regenerative brake unit configured to obtain a calculated regenerative braking force for road wheels;
a master cylinder actuated in accordance with a brake manipulated variable of a vehicle driver;
a liquid pressure brake unit having a pump to supply a brake liquid sucked from the master cylinder to wheel cylinders installed on the respective road wheels under pressure to obtain a calculated liquid pressure braking force, the regenerative brake unit, the master cylinder, and the liquid pressure brake unit being provided to obtain a driver's demanded braking force calculated on a basis of a brake manipulation by the vehicle driver; and
a control unit including:
a master cylinder state variable detecting section configured to detect a master cylinder state variable related to a state of the master cylinder;
a first regenerative braking force calculating section configured to calculate a first regenerative braking force when the master cylinder state variable detected by the master cylinder state variable detecting section is smaller than a predetermined state variable;
a second regenerative braking force calculating section configured to calculate a second regenerative braking force which is smaller than the first regenerative braking force when the master cylinder state variable detected by the master cylinder state variable detecting section is equal to or larger than the predetermined state variable; and
a braking control section configured to calculate the liquid pressure braking force on a basis of at least one of the calculated first and second regenerative braking forces, wherein
the control unit further includes a switch control section configured to increase the liquid pressure braking force while decreasing the calculated second regenerative braking force to realize the driver's demanded braking force,
the master cylinder state variable detecting section is a brake manipulated variable detecting section configured to detect a brake manipulated variable, and
the master cylinder is a stroke corresponding master cylinder in which a rise gradient of a master cylinder pressure with respect to the brake manipulated variable is largely generated in a case where the brake manipulated variable is equal to or larger than a first manipulated variable and the rise gradient of the master cylinder pressure with respect to the brake manipulated variable is small in a case where the brake manipulated variable is smaller than the first manipulated variable and the predetermined state variable is a predetermined brake manipulated variable equal to or smaller than the first manipulated variable.

2. The control apparatus for the vehicle as claimed in claim 1, wherein the control unit transmits the calculated regenerative braking force to the regenerative brake unit in a form of a command value.

3. The control apparatus for the vehicle as claimed in claim 1, wherein the control apparatus is set to generate a preset maximum regenerative braking force when the brake manipulated variable is the predetermined brake manipulated variable.

4. The control apparatus for the vehicle as claimed in claim 1, wherein the first regenerative braking force is a preset maximum regenerative braking force generated by the regenerative brake unit.

5. The control apparatus for the vehicle as claimed in claim 1, wherein the switch control section determines a decrease gradient of the second regenerative braking force per unit time on a basis of an increase gradient of the calculated liquid pressure braking force per unit time.

6. The control apparatus for the vehicle as claimed in claim 1, wherein the brake manipulated variable detecting section is a stroke sensor configured to detect a stroke of a brake pedal.

7. The control apparatus for the vehicle as claimed in claim 1, wherein the brake manipulated variable detecting section is a master cylinder pressure sensor configured to detect the pressure within the master cylinder.

8. A control apparatus for a vehicle, comprising:
a regenerative brake unit configured to obtain a regenerative braking force based on a calculated regenerative braking force command value for road wheels;
a master cylinder actuated in accordance with a brake manipulated variable of a vehicle driver;
a liquid pressure brake unit having a pump to supply a brake liquid sucked from the master cylinder to wheel cylinders installed on the respective road wheels under pressure to obtain a liquid pressure braking force based on a calculated liquid pressure braking force command value, the regenerative brake unit, the master cylinder, and the liquid pressure brake unit being provided to obtain a driver's demanded braking force calculated on a basis of a brake manipulation by the vehicle driver; and
a control unit including:
a brake manipulated state variable detecting section configured to detect a brake manipulated state variable related to a brake manipulation state of the driver;
a first regenerative braking force command value calculating section configured to calculate a first regenerative braking force command value when the brake manipulation state variable detected by the brake manipulation state variable detecting section is smaller than a predetermined state variable;
a second regenerative braking force command value calculating section configured to calculate a second regenerative braking force command value which is smaller than the first regenerative braking force command value when the brake manipulation state variable detected by the brake manipulation state variable is equal to or larger than the predetermined state variable; and
a braking control section configured to increase the liquid pressure braking force command value when the brake manipulation state variable detected by the brake manipulation state variable detecting section is equal to or larger than the predetermined state variable, wherein the control unit includes: a switch control section configured to increase the liquid pressure braking force command value while decreasing the calculated second regenerative braking force command value to realize the driver's demanded braking force,
the switch control section determines a decrease gradient of the second regenerative braking force command value per unit time on a basis of an increase gradient of the calculated liquid pressure braking force command value per unit time,
the brake manipulated variable detecting section is a stroke sensor configured to detect a stroke quantity of a brake pedal, and
the master cylinder is a stroke corresponding master cylinder in which a rise gradient of a master cylinder pressure with respect to a variation quantity of a brake stroke is largely generated in a case where a brake stroke quantity is equal to or larger than a first stroke quantity and the rise gradient of the master cylinder pressure with respect to the variation quantity of the brake stroke is small in a case where the brake stroke quantity is smaller than the first stroke quantity and the predetermined state variable is a brake stroke quantity equal to or smaller than the first stroke quantity.

9. The control apparatus for the vehicle as claimed in claim 8, wherein the first regenerative braking force command value is a preset maximum regenerative braking force generated by the regenerative brake unit.

10. The control apparatus for the vehicle as claimed in claim 9, wherein the regenerative brake unit is set to generate a preset maximum regenerative braking force in a case where the brake stroke quantity is a predetermined stroke quantity.

11. A control apparatus for a vehicle, comprising:
a regenerative brake unit configured to obtain a regenerative braking force based on a calculated regenerative braking force command value for road wheels;
a liquid pressure brake unit to obtain a liquid pressure braking force, the liquid pressure brake unit being configured to supply a brake liquid sucked from a master cylinder actuated in accordance with a brake manipulated variable of a vehicle driver to wheel cylinders installed on the respective road wheels to obtain the liquid pressure braking force based on the calculated liquid pressure braking force, the regenerative brake unit, the master cylinder, and the liquid pressure brake unit being provided to obtain a driver's demanded braking force calculated on a basis of a brake manipulation by the vehicle driver;
a brake manipulation stroke quantity sensor configured to detect a brake manipulated stroke quantity of the vehicle driver;
a first regenerative braking force command value calculating section configured to calculate a first regenerative braking force command value when the stroke quantity detected by the brake manipulation stroke quantity sensor is smaller than a predetermined stroke quantity;
a second regenerative braking force command value calculating section configured to calculate a second regenerative braking force command value which is smaller than the first regenerative braking force command value when the stroke quantity detected by the brake manipulation stroke quantity sensor is equal to or larger than the predetermined stroke quantity; and
a braking control section configured to increase the liquid pressure braking force command value and decrease the second regenerative braking force command value to generate the driver's demanded braking force when the stroke quantity detected by the brake manipulation stroke quantity sensor is equal to or larger than the predetermined stroke quantity, wherein the master cylinder is equipped with a master cylinder pressure limiting section configured to raise a master cylinder pressure when the brake manipulation stroke quantity is equal to or larger than a first stroke quantity and to limit a rise in the master cylinder pressure and the predetermined stroke quantity is equal to or smaller than the first stroke quantity.

12. The control apparatus for the vehicle as claimed in claim 11, wherein the regenerative brake unit is set to generate a preset maximum regenerative braking force in a case where the stroke quantity is the first stroke quantity.

* * * * *